(12) United States Patent
Stanhope et al.

(10) Patent No.: US 11,878,455 B2
(45) Date of Patent: Jan. 23, 2024

(54) VARIEGATED POLYMER-BASED MATERIALS

(71) Applicant: The AZEK Group LLC, Chicago, IL (US)

(72) Inventors: Bruce Edward Stanhope, Waynesville, OH (US); Jeffrey S. Ross, Lancaster, PA (US); Cesar Samano, Scranton, PA (US)

(73) Assignee: The AZEK Group LLC, Chicago, IL (US)

( * ) Notice: Subject to any disclaimer, the term of this patent is extended or adjusted under 35 U.S.C. 154(b) by 115 days.

(21) Appl. No.: 16/784,861

(22) Filed: Feb. 7, 2020

(65) Prior Publication Data

US 2020/0254673 A1 Aug. 13, 2020

Related U.S. Application Data

(60) Provisional application No. 62/803,303, filed on Feb. 8, 2019.

(51) Int. Cl.
*B29C 48/00* (2019.01)
*B29C 48/07* (2019.01)
(Continued)

(52) U.S. Cl.
CPC ............ *B29C 48/022* (2019.02); *B29C 48/07* (2019.02); *B29C 48/18* (2019.02); *B29C 48/845* (2019.02);
(Continued)

(58) Field of Classification Search
CPC ........ B29C 2059/023; B29C 2059/027; B29C 48/001; B29C 48/0022; B29C 48/022;
(Continued)

(56) References Cited

U.S. PATENT DOCUMENTS 10,981,350 B1 4/2021 Stephens et al.
2003/0021915 A1* 1/2003 Rohatgi ................. C08L 97/02
264/211.23
(Continued)

FOREIGN PATENT DOCUMENTS

EP 2 376 283 A2 10/2011
EP 2 736 721 A2 6/2014
(Continued)

OTHER PUBLICATIONS

Cellulose acetate sheets, Sigma Aldrich, retrieved from the Internet on Aug. 20, 2022, https://www.sigmaaldrich.com/US/en/search/cellulose-acetate-sheets?focus=products&gclid=EAlaIQobChMlgbzFv5jv-QIVj4vlCh0cgglbEAMYAiAAEgL6BPD_BwE&page=1&perpage=30&sort=relevance&term=cellulose%20acetate%20sheets&type=prod (Year: 2022).*
(Continued)

*Primary Examiner* — Frances Tischler
(74) *Attorney, Agent, or Firm* — Shook, Hardy & Bacon L.L.P.

(57) ABSTRACT

Polymer-based sheet materials having a variegated appearance are provided. The polymer-based-sheet material may have a core with one or more caps. The cap(s) may be on a first primary surface, a second primary surface, and/or sides. The variegation may be within and/or on the cap and/or the core. Methods, systems, articles, and materials effective for a polymer-based sheet material having a variegated appearance are provided.

17 Claims, 9 Drawing Sheets

(51) Int. Cl.
    *B29C 48/18*    (2019.01)
    *B29C 48/84*    (2019.01)
    *B29K 1/00*    (2006.01)
    *B29K 23/00*    (2006.01)

(52) U.S. Cl.
    CPC .... *B29K 2001/00* (2013.01); *B29K 2023/065* (2013.01)

(58) Field of Classification Search
    CPC ..... B29C 48/023; B29C 48/07; B29C 48/175; B29C 48/18; B29C 48/19; B29C 48/20; B29C 48/21; B29C 48/49; B29C 48/845; B29K 2001/00; B29K 2023/065; B29K 2311/14; B29L 2031/722
    See application file for complete search history.

(56) References Cited

U.S. PATENT DOCUMENTS

| | | |
|---|---|---|
| 2007/0141316 A1 | 6/2007 | McGrath et al. |
| 2010/0159213 A1* | 6/2010 | Przybylinski ............. B32B 1/00 428/537.1 |
| 2020/0070396 A1 | 3/2020 | Stephens et al. |

FOREIGN PATENT DOCUMENTS

| | | |
|---|---|---|
| WO | 02/103113 A2 | 12/2002 |
| WO | 2010/071879 A2 | 6/2010 |
| WO | 2013/019375 A2 | 2/2013 |

OTHER PUBLICATIONS

Cellulose sheet, Cytiva, sold on Amazon, retrieved from the Internet on Aug. 20, 2022, https://www.amazon.com/Whatman-10427806-Cellulose-Standard-Thickness/dp/B00DUKYXR8 (Year: 2022).*
HPDE sheet, Interactive Plastics, retrieved from the Internet on Aug. 20, 2022, https://www.interstateplastics.com/Hdpe-Natural-High-Density-Polyethylene-Sheet-HDPNE~~SH.php (Year: 2022).*
HDPE sheet, Interactive Plastics, retrieved from the Internet on Aug. 20, 2022, https://www.interstateplastics.com/Hdpe-Natural-Cutting-Board-Sheet-HDPNEC~SH.php (Year: 2022).*
Office Action received for Canadian Patent Application No. 3071663, dated May 3, 2021, 4 pages.
Office Action received for Canadian Patent Application No. 3071663, dated Dec. 2, 2021, 3 pages.
Notice of Allowance received for Canadian Patent Application No. 3071663, dated Aug. 18, 2022, 1 page.

* cited by examiner

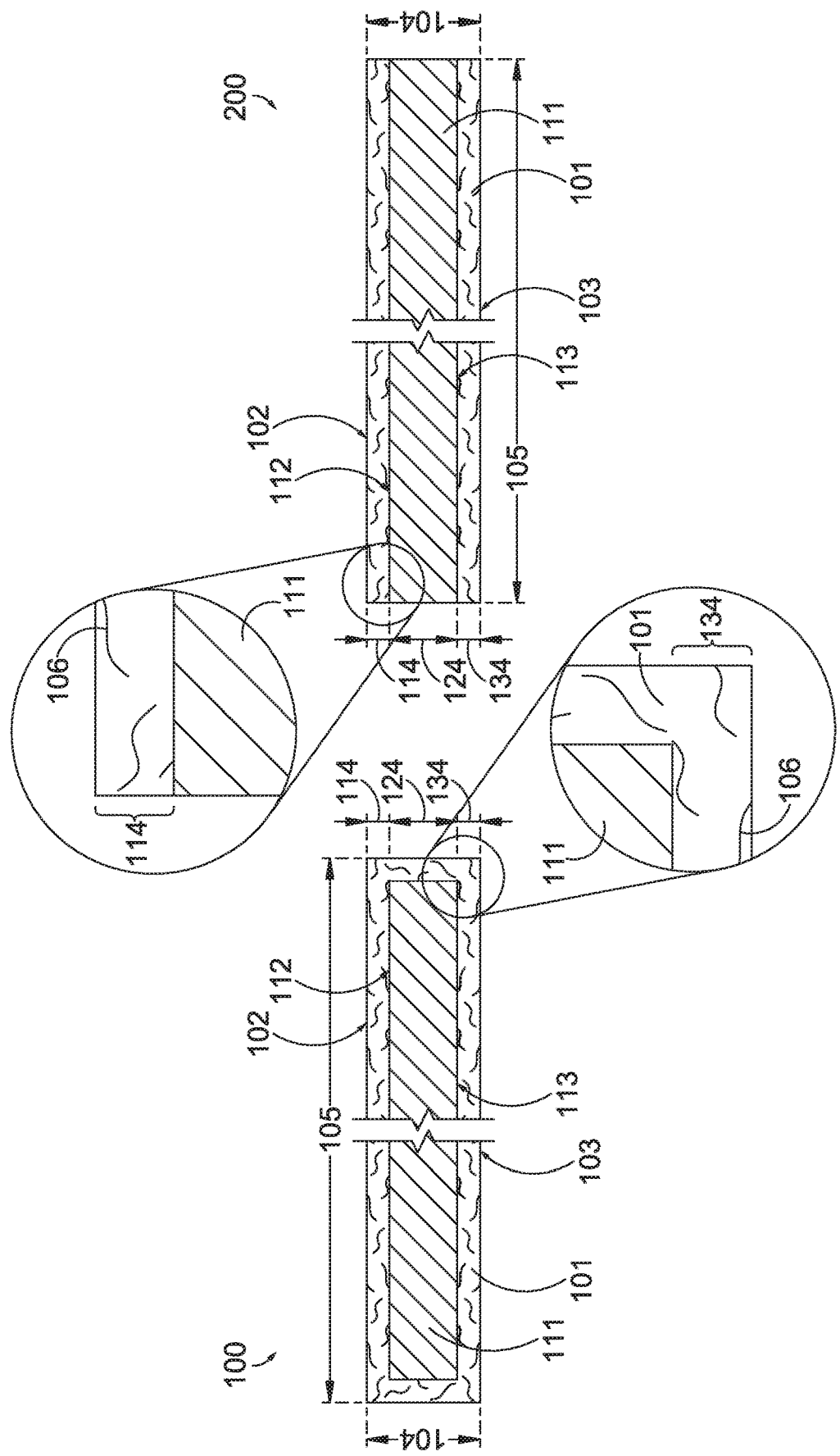

VARIEGATED POLYMER-BASED MATERIALS

CROSS REFERENCE TO RELATED APPLICATIONS

This application claims the benefit of U.S. Provisional Application No. 62/803,303, filed Feb. 8, 2019, entitled "Variegated Polymer-Based Materials," which is incorporated by referenced herein in its entirety.

BRIEF SUMMARY

Man-made alternatives to naturally occurring materials such as wood and stone can provide a number of advantages in construction and consumer products. For example, wood can rot, warp, splinter, discolor or bleach and stone can chip, shatter, discolor, or stain. Polymer-based materials forming a man-made alternative may be dent and impact resistant, resist rotting, include UV resistant additives, be sealed to prevent discoloration, and so on. Additionally, the cost of natural materials can be prohibitively expensive. That said, consumers may desire the aesthetic qualities of natural products. For example, the natural color variations of wood that occur through woodgrain or the natural visual imperfections that are present in stone can be the aesthetic attribute that a consumer desires.

Manufacturing techniques have successfully reproduced, at least to some extent, the aesthetic of naturally occurring materials in polymer-based boards, such as used in decking, by incorporating variegations in the extruded board. Variegations, or intentionally added color variations, can be added to extruded polymer-based boards by incorporating variegation agents into the polymeric resin during board extrusion. The variegation agents may be consistently, but not uniformly, incorporated into the board thereby approximating the visual aesthetic of natural wood and stone.

However, the properties of polymer-based sheets create unique manufacturing problems that may not be addressed by the traditional manufacturing techniques used to produce variegated polymer-based boards or the variegating agents used in traditional polymer-based board production. For example, although polymer-based boards and polymer-based sheets exist in a variety of widths and gauges (thicknesses), polymer-based boards and sheets differ in, at a minimum, the ratio of width to gauge (thickness). A polymer-based board is a product with a width to gauge ratio less than 12:1 at extrusion. A polymer-based sheet is a product with a width (e.g., width 105 of FIG. 4) to gauge (e.g., gauge 104 of FIG. 4) ratio greater than or equal to 12:1 at extrusion. As such, an extruded "2×4", which matches the dimensions of a wood 2×4 after drying and processing, is 1.5 inches (38.1 mm) thick by 3.5 inches (88.9 mm) wide is a board. An extruded "1×12", which matches a traditional wood 1×12 after drying and processing, is a sheet because it has a ratio determined by a thickness of 0.75 inches (19.05 mm) and a width of 11.25 inches (285.75 mm).

The difference in width to gauge ratio between boards and sheets may be problematic during manufacturing. For example, consistent distribution of variegating agents throughout extruded polymer-based sheets is relatively poor with traditional board variegating agents and associated processes. In some cases, when used to variegate a polymer based sheet, traditional board variegating agents disproportionately spread to the outer edges of the sheet during the extrusion process. In an extruder using a traditional board extrusion configuration results in flow dynamics, such as laminar flow, induced in the melted polymer to potentially create disproportionate spreading of traditional board variegating agents to the outer edges of the mixture during sheet extrusion. While the width to gauge ratio of board extrusion dies may sufficiently address this problem by forcing the mixture into a tighter profile, the increased width to gauge ratio in sheet extrusion can magnify the inconsistency and result in an unacceptable variegation of a sheet.

It is this difference in the ratio of width to gauge of boards and sheets that impacts the manufacturing process of a polymer-based sheet. The flow characteristics through the extrusion die are different for a sheet relative to a board because of the width to gauge ratio difference. The thermal properties of the materials forming the sheet during extrusion and post extrusion may be different from a board because of the width to gauge ratio difference. The volume of material and relative volumes of different materials (e.g., core and cap) forming a sheet may be different for the sheet relative to the board because of the width to gauge ratio difference. The structural characteristics and the end use of the sheet relative to a board may be different, in part because of the width to gauge ratio difference. Additional distinctions resulting from the difference in a width to gauge ratio of sheets and boards are explored hereinafter that further highlight the material, process, parameter, and system difference to form a variegated polymer-based sheet as compared to a variegated polymer-based board.

For example, it can be problematic to produce variegated polymer-based sheets because traditional board variegating agents can prematurely melt or otherwise dissipate during a sheet extrusion process performed under a traditional board extrusion configuration. The melted board variegating agent may then be over homogenized into the polymer-based sheet mixture, which can result in an extruded sheet material of the wrong color and without variegation. This premature melt or dissipation of traditional board variegating agents is potentially caused, in part, by the width to gauge ratio difference of a sheet relative to a board.

Another limitation of applying traditional board compositions and manufacturing techniques is consistent distribution of variegation from start to finish of the sheet in a material flow direction. Said differently, the distribution of variegation from a first portion of the polymer-based material to exit the extrusion die through a last portion to exit the extrusion die may not be consistent. This inconsistency is potentially caused, in part, by the width to gauge ratio difference of a sheet relative to a board. This inconsistency can produce excess waste and aesthetically unsatisfactory products.

Yet another limitation of traditional compositions and manufacturing techniques is the relatively high level of gloss that can obscure the visual distinction between the variegating agent and the base color. Said differently, the intentional color variations can be masked by the relatively high reflectivity and diffraction of the capstock created via traditional manufacturing techniques. The high level of gloss can result in an extruded sheet material with an appearance visually distinct from the natural alternative and aesthetically unsatisfactory products.

Accordingly, variegated polymer-based sheet materials as well as methods and systems for producing polymer-based sheets with variegations created via the inclusion of variegating agents is provided herein.

BRIEF DESCRIPTION OF THE DRAWINGS

Illustrative embodiments of the present invention are described in detail below with reference to the attached drawing figures, and wherein:

FIG. 1A depicts an example end grain view of a polymer-based sheet, according to aspects described herein;

FIG. 1B depicts an example end grain view of another polymer-based sheet, according to aspects described herein another aspect;

DETAILED DESCRIPTION

Figure 2B:
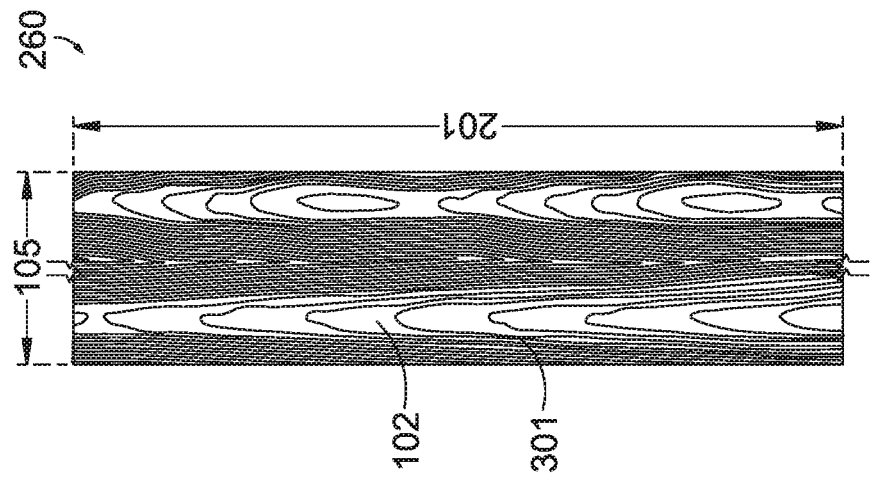
FIG. 2B depicts a top view of an example embossing pattern for a variegated polymer-based sheet, according to aspects described herein.

Polymer-based sheets, such as those described herein can provide a number of beneficial advantages over the naturally occurring equivalents, such as wood and stone. For example, the polymeric composition can be tailored for the intended end-use by including UV protecting agents, scratch and dent resistance agents, antimicrobial agents, and so forth. For example and in reference to the Figures, such as FIGS. 1A-4, in some aspects of the polymer-based sheets described herein comprise a cap 101. Generally, the cap 101 comprises capstock and serves as the outward facing portions of at least the top and, optionally, the bottom of the sheet and is exposed to the most wear and tear. As such, some aspects of the cap 101 described herein include an additive to increase the durability or range of possible end uses the polymer-based sheet may be suitable for. Additionally, polymer-based sheets can be tailored to include multiple polymers through co-extrusion of two or more polymeric mixtures. For example, some intended uses of polymer-based sheets can require enhanced rigidity, reduced cost, reduced weight, or other properties unachievable in single extrusion sheets. Accordingly, some aspects of the polymer-based sheets described herein comprise a core 111 including a first polymeric mixture and a core 111 including a second polymeric mixture. Again, generally, core 111 serves as an inner portion of the sheet and can comprise additives and fillers. In some aspects, inclusion of the core 111 can facilitate enhanced rigidity, reduced cost, reduced weight, or other properties while the cap 101 provides durability. Additionally, polymer-based sheets can be produced in a variety of uniform colors through the inclusion of traditional base colorants.

Although the use of polymer-based sheets in construction and consumer products provides a number of beneficial advantages, production of polymer-based sheets with aesthetic qualities similar to natural stone and wood has limitations. As mentioned above, emulating the natural color variations of wood or the natural visual imperfections that are present in stone have been problematic in polymer-based sheets, at least partially, because of differences between board extrusion techniques and sheet extrusion techniques may prevent consistent variegation using traditional board variegating agents and/or process parameters.

As used herein, "board" refers to an extruded object with a width to gauge (thickness) ratio less than 12. Whereas, the term "sheet" refers to an extruded object (foamed or non-foamed) with a width to gauge ratio greater than or equal to 12.

The term "variegating agent" refers to a colorant (e.g., pigment, dye, stain, ink, or any similar compound) having at least one constituent polymer comprising: (1) long chain polymers (for example olefins or other unsaturated hydrocarbons); (2) long chain polymers with one or more functional groups such as amine, alkene, alkyl halide, carbonyl (for example carboxylic acid, aldehyde, amide), or esters; or (3) repeating macromolecules (for example polyamides, polypeptides, polyamines, or the like), that are included to intentionally provide variations in the hue, tint, shade, tone, saturation, lightness, chroma, intensity, or other visual property of the extruded polymer-based sheet. Variegations refer to intentional variations in the color of an extruded polymer-based material created by at least one variegating agent.

A base colorant is any pigment, dye, stain, ink, or any similar organic or inorganic compound included to intentionally alter the hue, tint, shade, tone, saturation, lightness, chroma, intensity, and/or other visual property of a polymer in a homogenous manner.

Capstock refers to a polymer-based resin comprising one, more than one, or any combination of: high-density polyethylene (HDPE), low-density polyethylene (LDPE), polyvinyl chloride (PVC), polypropylene (PP), and/or nylon. The capstock may also comprise one or more additives and/or filler. A cap portion of a polymer-based sheet is formed, at least in part, from capstock.

Corestock refers to polymer-based resin comprising one, more than one, or any combination of: high-density polyethylene (HDPE); low-density polyethylene (LDPE); polyvinyl chloride (PVC); polypropylene (PP); acrylonitrile; alpha-olefins such as ethylene, propylene, etc.; chlorinated monomers such as vinylidene, dichloride; acrylate monomers such as acrylic acid, methylacrylate, methyl-methacrylate, acrylamide, hydrox-ethyl acrylate, and others; styrenic monomers such as styrene, alpha methyl styrene, vinyl toluene, etc.; vinyl acetate; and/or other commonly available ethylenically unsaturated monomer compositions. Corestock can further comprise one or more of a filler and/or additive. A core portion of a polymer-based sheet is formed, at least in part, from corestock.

Filler refers to one, more than one, or any combination of: cellulose or compounds (naturally occurring, refined, manufactured, or produced) containing cellulose such as wood flour; $CaCO_3$ or compounds (naturally occurring, refined, manufactured, or produced) containing $CaCO_3$, such as limestone, dolomite, aragonite, precipitated $CaCO_3$, and so forth; fieldstone; granite; and/or clay or clay containing compounds such as talc, smectites, calcium silicates, aluminum silicates, fly ash, and so forth.

Additive refers to one, more than one, or any combination of: fire retardant compounds (such as aluminum trihydrate or magnesium hydroxide), inorganic anti-microbial compounds (such as: elemental copper, copper alloys, or cuprous/cupric compounds; elemental silver, silver alloys, or silver compounds; zinc alloys or zinc compounds), organic anti-microbial compounds (such as: halogen based organic biocides, nitrogen based organic biocides, quaternary ammonium compounds, phenol/phenolic biocides, and so forth), scratch/mar resistant polymers (such as polypropylene) or compounds, UV protectant materials (such as oxanilides, benzophenones, benzotriazoles, hydro xyphenyltriazine s, hydroxybenzophenone, hydroxyphenylbenzotriazole, $TiO_2$, carbon black, 2,2,6,6-tetramethylpiperidine ring containing amines, and so forth) and/or any combination thereof.

As referenced herein, "ASTM" refers to the 2018 volume of ASTM Tests for Chemical, Physical, and Optical Properties. For example, ASTM D-3418 refers to ASTM Standard Test Method for Transition Temperatures and Enthalpies of Fusion and Crystallization of Polymers by Differential Scanning calorimetry as detailed in the 2018 volume of ASTM Tests for Chemical, Physical, and Optical Properties. The 2018 volume of ASTM Tests for Chemical, Physical, and Optical Properties is incorporated by reference herein in its entirety.

With reference to FIGS. 1A, 1B, 2A, 2B, 3A, 3B, and 4 exemplary polymer-based sheet materials are provided in accordance with aspects described herein. The polymer-based sheet 100 and 200 comprises one or more polymeric resin mixtures and variegations 106 created by at least one variegating agent. Some aspects of polymer-based sheet 100 are manufactured by an extrusion system, such as extrusion system 500 as discussed in regards to FIGS. 5A, 5B, 5C, 6, and 7. Additionally, some aspects of polymer-based sheet 100 and 200 may be produced by a method, such as method 800 as discussed in relation to FIG. 8.

In some aspects, the polymer-based sheet 100 and 200 further comprise a polymer-based cap 101 and a polymer-based core 111. The polymer-based cap 101 comprises a first polymeric resin and variegations 106 created by at least one variegating agent. In an example aspect, the first polymeric resin comprises capstock and at least one variegating agent. The first polymeric resin can further include a base colorant, one or more additives, or any combination thereof.

As mentioned above, the relatively high level of gloss of the polymer-based cap 101 can obscure the visual distinction between the variegations 106 and the base colorant in traditional techniques. One way to address this limitation is to incorporate a deglos sing agent in the first polymeric resin. A deglossing agent can include calcium carbonate ($CaCO_3$), silicon dioxide ($SiO_2$), naphtha, isopropanol, mineral spirits, ethyl acetate, toluene, or any combination thereof. During extrusion, the deglossing agent can alter the morphological structure of the polymer-based cap 101 and thereby reduce the reflectivity, diffraction, or a combination of both of the first polymeric resin. In some aspects, inclusion of at least one deglossing agent can reduce the specular gloss to between 20% and 5% as measured by ASTM D523 at an angle of incidence of 85°.

The polymer-based core 111 comprises a second polymeric resin and a colorant. In an example aspect, the second polymeric resin comprises HDPE, LDPE, PVC, or a combination thereof. In some aspects, the polymer-based core 111 further comprises a filler. Additionally, in some aspects, the polymer-based core 111 comprises variegations 401 created by one or more variegating agents.

Further, the polymer-based core 111 comprises a first planar surface 112, and a second planar surface 113 opposite the first planar surface 112. In some aspects, the polymer-based cap 101 comprises a first cap portion 102 and a second cap portion 103. The first cap portion 102 of the polymer-based cap 101 is adjacent the first planar surface 112 of the polymer-based core 111. The second cap portion 103 of the polymer-based cap 101 is adjacent the second planar surface 113 of the polymer-based core 111. As depicted in FIG. 1A, in some aspects the first cap portion 102 and the second cap portion 103 of the polymer-based cap 101 can encapsulate the polymer-based core 111. However, it is also contemplated that the first cap portion 102 and the second cap portion 103 of the polymer-based cap 101 are co-extensive with the first planar surface 112 and the second planar surface 113 of the polymer-based core 111, respectively and as depicted in FIG. 1B. Further, (although not depicted) in some aspects, the first cap portion 102 and the second cap portion 103 can partially encapsulate the polymer-based core 111.

Further, the polymer-based sheet 100 has a gauge (thickness) 104, a width 105, and a length 201. The gauge 104 of the polymer-based sheet 100 may be any thickness and may vary based on the intended use. For example, in some aspects, the gauge 104 is 0.25 inches (6.35 mm), 0.50 inches (12.7 mm), 1.00 inches (25.4 mm), 1.25 inches (31.75 mm), or 1.50 inches (38.1 mm). In some aspects, the gauge 104 is within a range of 0.25 inches (6.35 mm) and 1.50 inches (38.1 mm). The first cap portion 102 of cap 101 has a gauge 114 and the second cap portion 103 of cap 101 has a gauge 134. The gauges 114 and 134 may be any thickness and may vary based on the intended use. For example, in some aspects, gauges 114 or 134 are 0.0625 inches (1.5875 mm), 0.0714 inches (1.814 mm), 0.0833 inches (2.117 mm), 0.0875 inches (2.225 mm), 0.125 inches (3.175 mm), 0.25 inches (6.35 mm), 0.47 inches (12 mm), 0.50 inches (12.7 mm), or 0.625 inches (15.875 mm). The gauge 124 of the polymer-based core 111 may be any thickness and may vary based on the intended use. For example, in some aspects, the gauge 124 is 0.125 inches (3.175 mm), 0.175 inches (4.445 mm), 0.25 inches (6.35 mm), 0.50 inches (12.7 mm), 1.00 inches (25.4 mm), or 1.25 inches (31.75 mm).

In an example embodiment, the gauge 104 of the polymer-based sheet 100 overall is 0.25 inches (6.35 mm), wherein the first cap portion 102 and the second cap portion 103 of the polymer-based cap 101 have a combined gauge of 0.175 inches (4.445 mm) and the polymer-based core 111 has a gauge 124 of 0.175 inches (4.445 mm). In another example embodiment, the gauge 104 of the polymer-based sheet 100 overall is 0.50 inches (12.7 mm), wherein the first cap portion 102 and the second cap portion 103 of the polymer-based cap 101 have a combined gauge of 0.25 inches (6.35 mm) and the polymer-based core 111 has a gauge 124 of 0.25 inches (6.35 mm).

The width 105 of the polymer-based sheet 100 may be any width and may vary based on the intended use. For example, in some aspects, the width 105 is 3 inches (76.2 mm) or 152 inches (3860.8 mm). In some aspects, the width 105 is between 3 inches (76.2 mm) and 152 inches (3860.8 mm). The length 201 may be any length and may vary based on the intended use. In some aspects, the length 201 is between 0.5 feet (ft.) (0.1524 m) and 60 ft. (18.288 m).

Figure 2A:
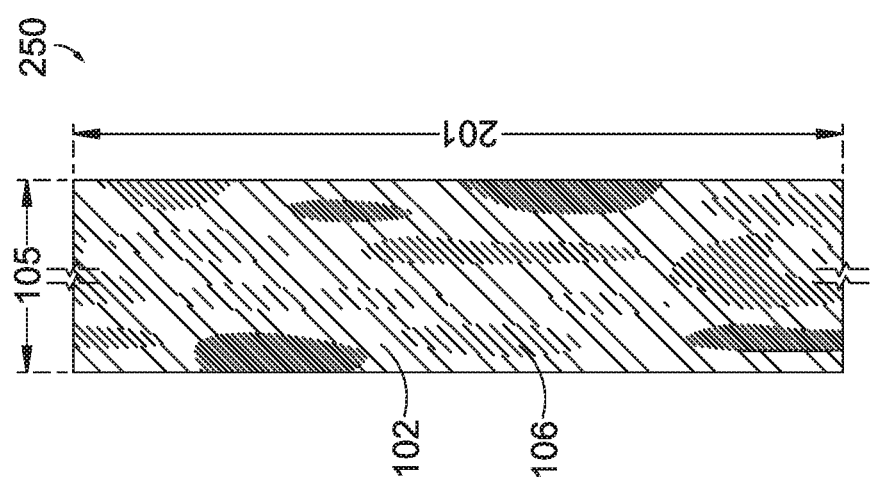
FIG. 2A depicts a top view of an example variegated polymer-based sheet, according to aspects described herein.
Figure 3B:
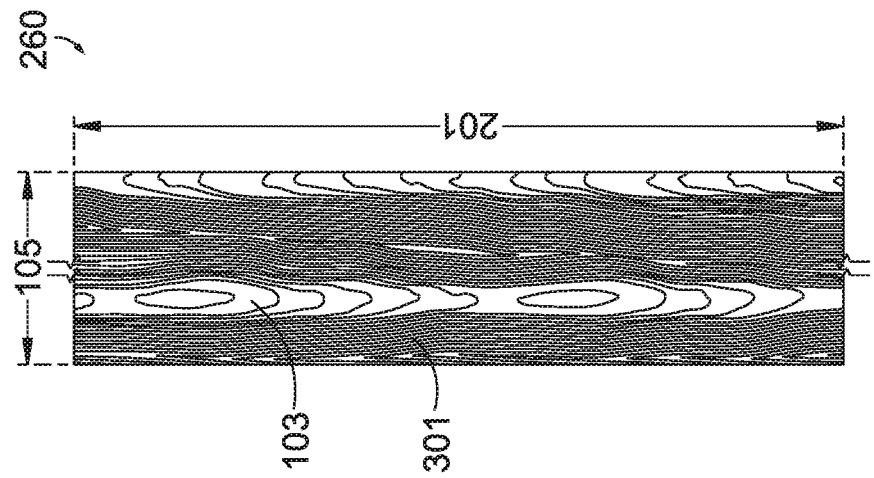
FIG. 3B depicts a bottom view of an example embossing pattern for a variegated polymer-based sheet, according to aspects described herein.
Figure 3A:
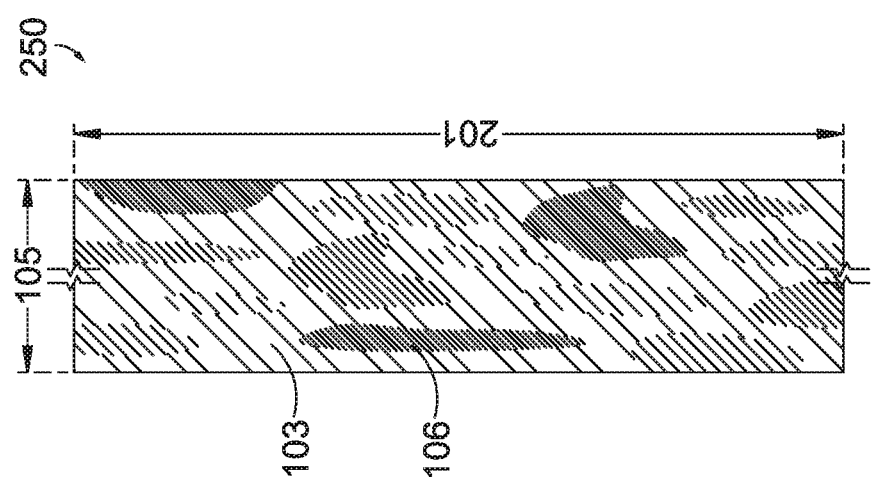
FIG. 3A depicts a bottom view of an example variegated polymer-based sheet, according to aspects described herein.

Continuing, and with specific reference to FIG. 2A, a top view of an example variegated polymer-based sheet 250 is depicted in accordance with aspects described herein. The variegated polymer-based sheet 250 may be illustrative of aspects of polymer-based sheet 100, 200, or both. As depicted, the first cap portion 102 comprises a plurality of variegations, such as variegation 106. The variegations may occur in random patterns, sizes, shapes, and densities as variegating agents are incorporated into the first cap portion 102 during extrusion. With brief reference to FIG. 2B, a top view of an example embossed polymer-based sheet 260 is depicted in accordance with aspects described herein. The embossed polymer-based sheet 260 is illustrative of aspects of polymer-based sheet 100, 200, or both. After extrusion, a polymer-based sheet can be embossed with an embossing pattern 301 by embosser, such as embosser 509 of FIG. 5. The embossing pattern 301 may be patterned in any suitable configuration to include emulations of naturally occurring textures (such as quarter sawn woodgrains, rift sawn woodgrains, plain sawn woodgrains, rough-hewn stone, and so forth) or artificial textures designed for aesthetic appeal or increased friction/traction. Similarly, FIGS. 3A and 3B depict a bottom view of example variegated polymer-based sheet 250 and embossed polymer-based sheet 260.

Figure 4:
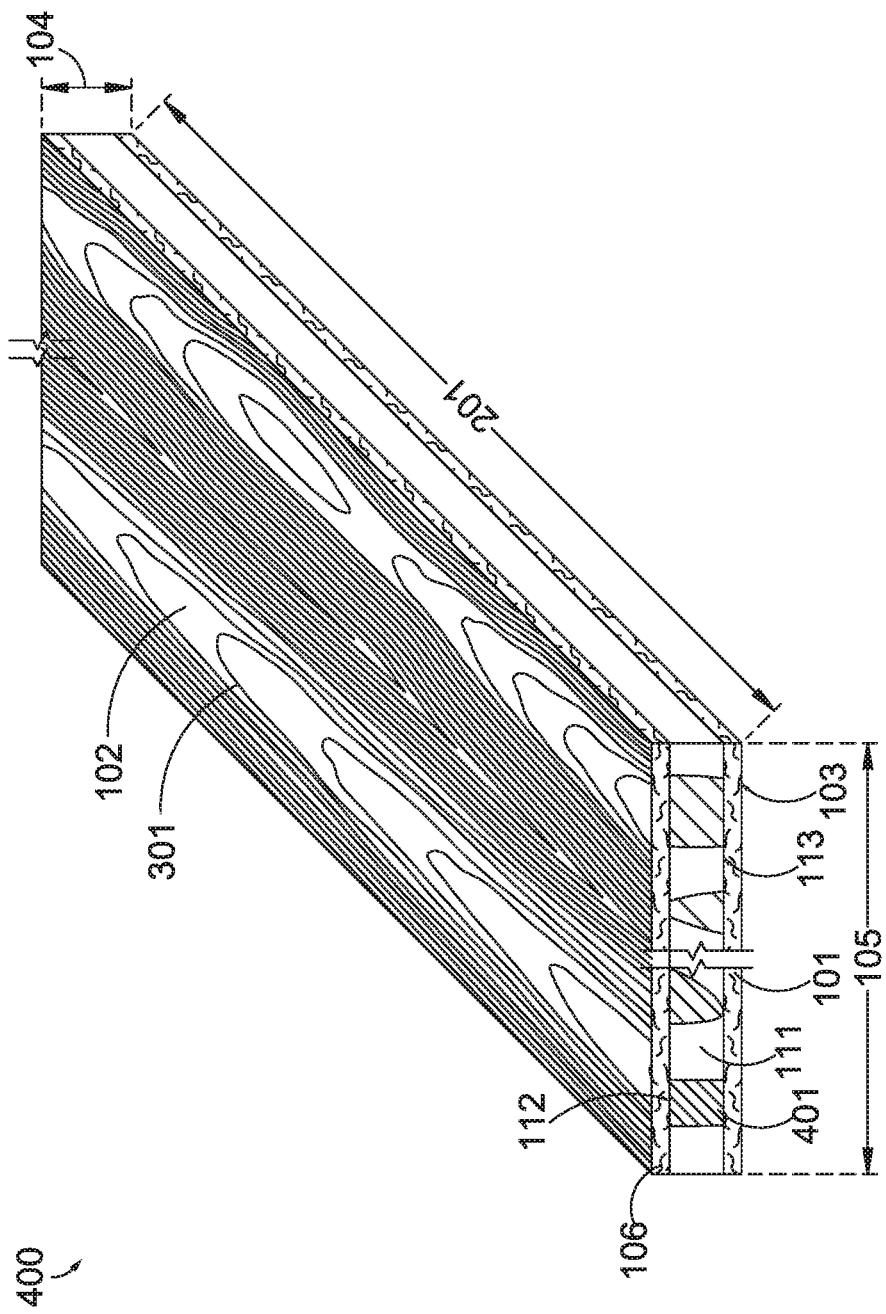
FIG. 4 depicts a perspective view of an example embossed and variegated polymer-based sheet, according to aspects described herein.

Turning to FIG. 4, a perspective view of an example embossed and variegated polymer-based sheet 400 is depicted in accordance with aspects described herein. The embossed and variegated polymer-based sheet 400 may be illustrative of aspects of polymer-based sheet 100, 200, or both. Polymer-based sheet 400 comprises core variegations 401 in the core 111. Core variegations 401 may be created by including a variegating agent in the corestock as it enters the core extruder or at a second location in the core extruder.

Figure 5A:
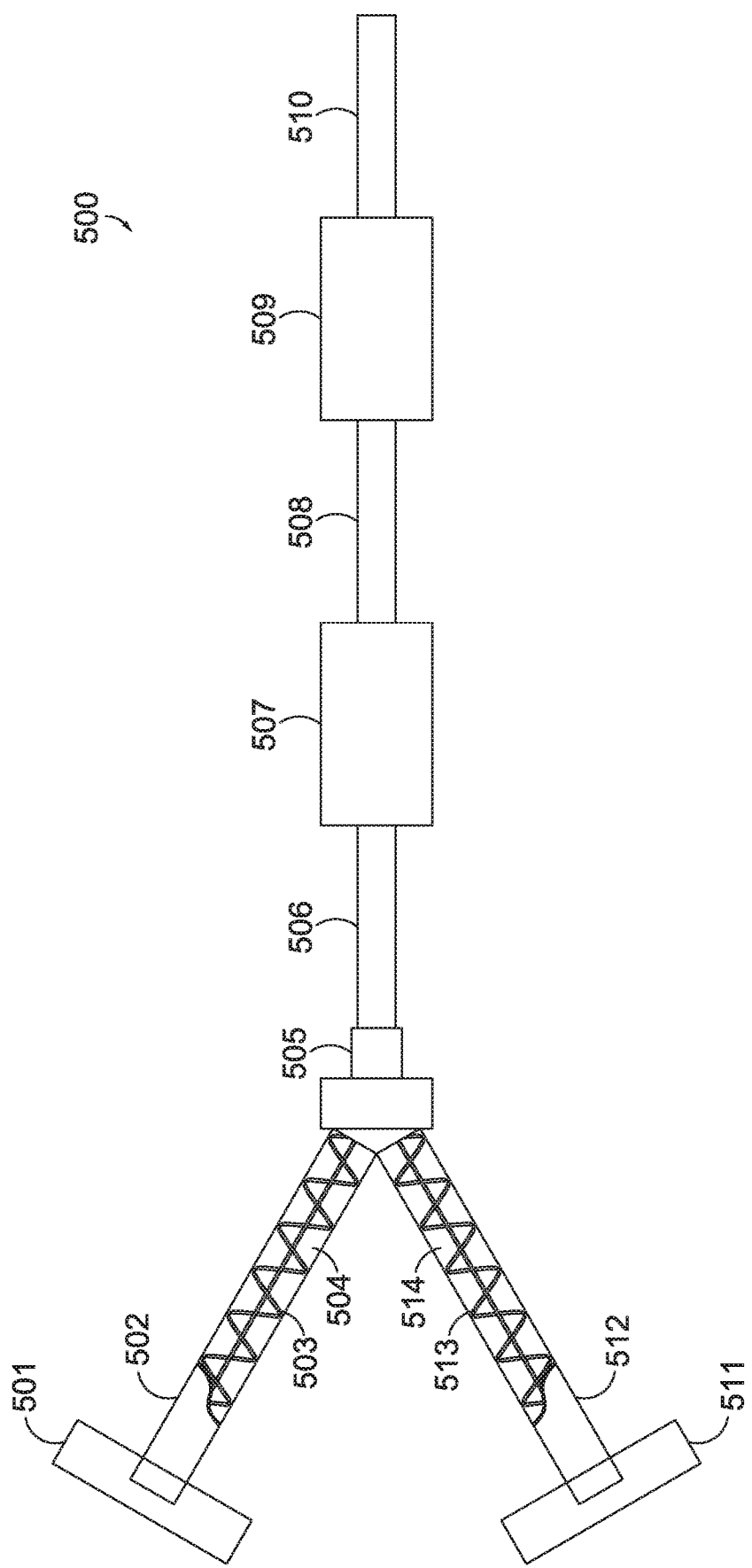
FIG. 5A depicts an example system, according to aspects described herein.

Turning to FIG. 5A, an example system 500 is provided in accordance with aspects described herein. Generally, system 500 facilitates the manufacture of a polymer-based sheet with improved consistency in variegation, such as polymer-based sheets 100, 200, 250, 260, and/or 400 described in relation to FIGS. 1A-B, 2A-B, 3A-B, and 4. For example, some aspects of system 500 may enable more consistent variegation by including variegating agents with a lower pellet density than traditional variegating materials. As used in reference to a variegating agent, the term pellet density refers to the amount or quantity of variegating agent pellets that equal 1 gram. As an illustration, a variegating agent with a pellet density of 60 pellets/g is more dense than a variegating agent with a pellet density of 40 pellets/g. The quantity of pellets per gram may be influenced by a manipulation of pellet volume, pellet composition, and/or pellet shape. For example, in some instances a variegating agent pellet that is effective for polymer-based sheet production has a similar mass, but a greater volume than a variegating agent pellet used in connection with polymer-based board production. In this example, the distribution of the variegating agent from the variegating agent pellet during a polymer-based sheet extrusion results in a more consistent variegation.

For example, a decreased pellet density of the variegating agent pellet may provide increased inertial resistance to the flow dynamics in a polymer-based sheet extruder and facilitate consistent distribution of the variegating agent at the extrusion die. For another example, some aspects of system 500 may enable consistent variegation by increasing a ratio between an initial melting point of the variegating agent and the initial melting point of the polymer mixture to facilitate consistent distribution of the variegating agent while minimizing undesired and/or premature liquefaction of the variegating agents. The increased initial melting point ratio at least partially prevents homogenization of the variegation colorant and the polymer colorant that may occur in traditional systems, such as systems used to produce a board rather than a sheet. Additionally, some aspects of system 500 may enable improved consistency in variegation by altering the traditional extrusion barrel thermal profile such that the highest barrel temperature occurs farthest or farther from the extrusion die.

System 500 comprises a cap hopper 501, a cap extruder 502, and an extrusion die 505. Generally, cap hopper 501 can be any container that can facilitate feeding cap extruder 502 with a first polymer-based mixture with a variegating agent. Cap extruder 502 comprises inner hollow portion (e.g., inner barrel 504) that encircles the length of an extrusion screw 503. As the extrusion screw 503 rotates, the first polymer-based mixture is forced toward the extrusion die 505. Cap extruder 502 also comprises one or more heating zones, such as those discussed with reference to FIG. 6.

Some aspects of system 500 also comprise a core hopper 511 and a core extruder 512. Generally, the core hopper 511 can be any container that facilitates feeding core extruder 512 with a second polymer-based mixture. Core extruder 512 comprises an inner hollow portion (e.g., inner barrel 514) that encircles the length of an extrusion screw 513. As the extrusion screw 513 rotates, the second polymer-based mixture is forced toward the extrusion die 505. Core extruder 512 also comprises one or more heating zones, such as those discussed with reference to FIG. 6.

Accordingly, some aspects of system 500 can facilitate co-extrusion of two or more polymer-based mixtures. For example, cap extruder 502 can provide extrusion die 505 with a first polymer-based mixture and core extruder 512 can provide extrusion die 505 with a second polymer-based mixture. However, temperature and compositional differences between the cap, the variegating agent, and the core can prevent complete lamination of an extruded polymer-based sheet. For example, some variegating agents can inhibit adhesive bonding (e.g., physical mixing, hydrogen bonds, polymeric entanglement, covalent bonds, or other similar adhesive forces) between the polymers of the cap and the polymers of the core immediately proximate a variegating agent. For another example, differences in the thermal conductivity and thermal retention properties of polymers in the cap and the polymers in the core can inhibit adhesive bonding between the polymers of the cap immediately proximate the polymers of the core. By adjusting the ratio of cap to core thickness, the lamination of the polymer-based cap and the polymer-based core can be enhanced. Accordingly, in some aspects, extrusion screws 503 and 513 can be programmatically or manually controlled such that speed of rotation for each extrusion screw can be independently adjusted to affect the ratio of cap to core thickness. In some aspects, the extrusion screw 503 can rotate faster than extrusion screw 513. Alternatively, in some aspects, the extrusion screw 503 can rotate slower than extrusion screw 513. Still further, in some aspects, the extrusion screw 503 can rotate at the same speed as extrusion screw 513.

Additionally, some aspects of system 500 can include computer controlled feeders that provide the cap hopper 501, cap extruder 502, core hopper 511, core extruder 512, or any combination thereof with one or more variegating agents. The computer controlled feeders can time the release and the amount of variegating agent released to enable variable control of variegation concentration, intensity, or "bleed out."

As mentioned above, a limitation of traditional board manufacturing techniques and compositions can be a relatively high level of gloss that can obscure the visual distinction between the variegating agent and the base color. Accordingly, some aspects of system 500 further include abrader 507. Generally, abrader 507 facilitates mechanical abrasion of a extruded polymer-based sheet for a predetermined amount (e.g., time pressure, speed), such as variegated polymer-based sheet 506 or embossed variegated polymer-based sheet 508. A predetermined period of time of mechanical abrasion can be in a range of about 5 seconds and about 15 seconds for a defined portion of the polymer-based sheet, in some aspects. However, it is contemplated that the predetermined time can vary based on the specific abrasion agents, the initial specular gloss of the variegated polymer-based sheet 506, and/or the target specular gloss of the variegated polymer-based sheet 506.

Continuing, abrader 507 includes one or more brush, pad, sheet, and/or sprayer that mechanically scours the outer surface of the extruded polymer-based sheet with an abrasion agent. For example, abrader 507 can include a computer controlled random orbital sander, rotary brush, rotary sander, belt sander, sand blaster, or any similar device. Additionally, or alternatively, abrader 507 can include a liquid, aqueous, or solid dispersal system that applies an abrasion agent on an outer surface of the extruded polymer-based sheet. Abrasion agents can include nylon, polyester, polypropylene, silicon based materials, steel wool, any combination thereof, or any similar material that can abrade a surface. Abrasion agents can also include feldspar (e.g., aluminosilicates of potassium, sodium, and calcium), limestone, sodium bicarbonate, citric acid, magnesium sulfate, silica, quartz, spinel, vitreous glass, aluminum oxide, zirconium oxide, diamond, other natural or synthetic minerals with Mohs hardness greater than 5, or any combination thereof.

The abrader 507 also includes a computerized pressure control that monitors and controls the force exerted by the abrader on a polymer-based sheet. For example, the computerized pressure control can detect the pressure currently applied to the variegated polymer-based sheet 506 by the abrader 507. The current pressure is then compared to a target pressure. If the current pressure and the target pressure do not match, the pressure control adjusts the pressure as needed.

Continuing with FIG. 5A, system 500 can also include embosser 509. Generally, embosser 509 uses pressure, heat, or a combination of both to emboss a pattern into an outer surface of a polymer-based sheet, such as sheet 100 or 200. Embosser 509 includes one or more plates or rollers with the embossing pattern 301 (of FIGS. 2B and 3B) in negative relief.

As mentioned above, a relatively high level of gloss can obscure the visual distinction between the variegating agent and the base color in traditional techniques. One way to address this limitation is to reduce the gloss during the embossing process. For example, by controlling a pre-embossing temperature of an extruded sheet, controlling the temperature of the extruded sheet as the extruded sheet is embossed, or a combination of both may facilitate a decreased reflectance and/or diffraction of the polymers in the cap of the extruded sheet, which can reduce the gloss of the extruded sheet Accordingly, some aspects of embosser 509 includes a computerized temperature control that monitors, adjusts, and/or maintains the temperature of the pre-embossing area of embosser 509. The temperature controller of embosser 509 can monitor the temperature of one or more portions of the variegated polymer-based sheet 506 (e.g., the first cap portion 102, the second cap portion 103, or both). Additionally, the temperature controller of embosser 509 can increase or decrease the temperature of each portion of the variegated polymer-based sheet 506 independently. For example, the temperature controller can increase or decrease the output of a heating element such that temperature of the first cap portion 102 is in a range of about 93° C. to about 104° C. pre-embossing. The temperature controller can also increase or decrease the output of another heating element such that the temperature of the second cap portion is in a range of 104° C. to about 115° C. pre-embossing.

Similarly, the temperature controller of embosser 509 can monitor, adjust, and/or maintain the temperature of the embossing area of embosser 509 (e.g., the portion of embosser 509 containing the embossing plate or roll). For example, the temperature controller of embosser 509 increase or decrease the output of an embossing heating element such that the embossing area of embosser 509 is in a range of about 49° C. to about 149° C.

The embosser 509 also includes a computerized pressure control module that monitors and controls the force used by embosser 509 on a polymer-based sheet, such as variegated polymer-based sheet 506 or abraded and variegated polymer-based sheet 508. For example, embosser 509 may emboss the first cap portion 102 and the second cap portion 103 of polymer-based sheet 100, 200 (as referenced in FIGS. 1A and 1B) by pressing the negative relief of embossing pattern 301 (of FIGS. 2B and 3B) into the polymer-based sheet with about 20 pounds of pressure per square inch, in an example. It is contemplated that additional or fewer forces may be used. It is also contemplated that a single portion (e.g., one cap portion but not another cap portion) may be embossed individually.

Figure 5C:
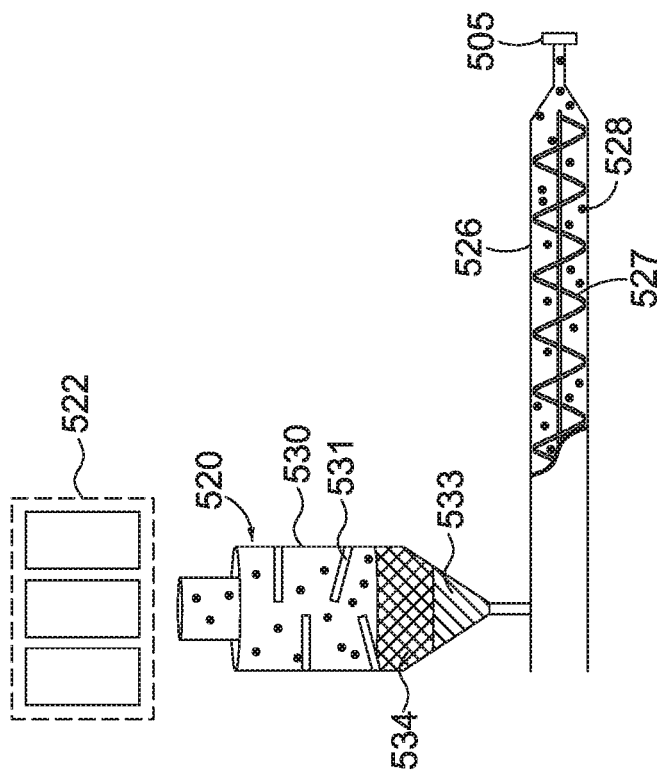
FIG. 5C depicts a selective cross sectional view of another example hopper and extruder, according to aspects described herein.
Figure 5B:
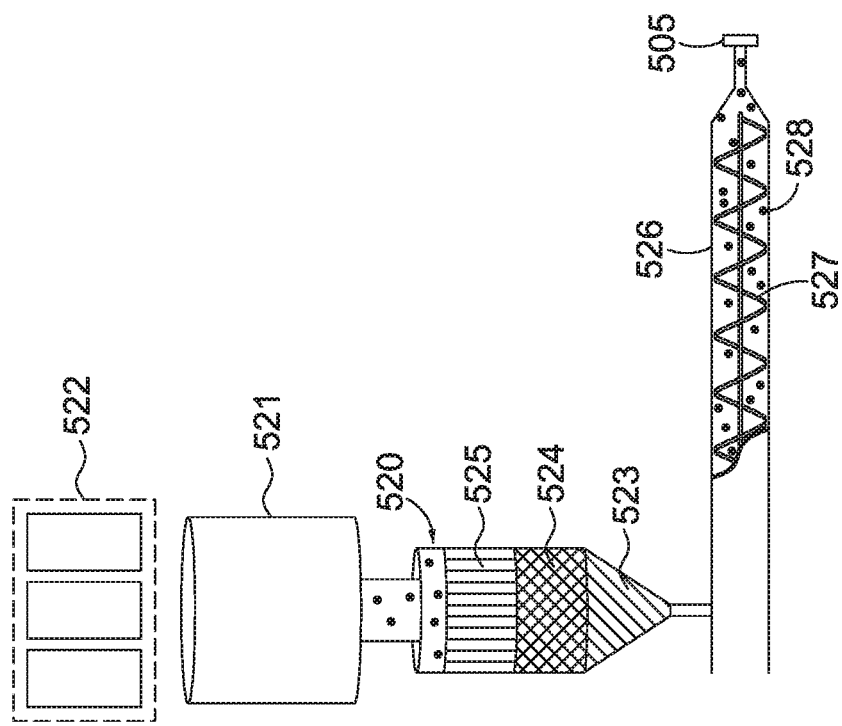
FIG. 5B depicts a selective cross sectional view of an example hopper and extruder, according to aspects described herein.

With brief reference to FIG. 5B and continued reference to FIG. 5A, a hopper 520, suitable for use as cap hopper 501, core hopper 511, or both is depicted in accordance with aspects described herein. The hopper 520 generally provides temporary storage of a batch of pre-extrusion polymeric material immediately prior to entry into an extruder 526. In some aspects, extruder 526 can be cap extruder 502, core extruder 512, or both. As depicted in FIG. 5B the variegating agent, capstock or corestock, additives, fillers, base colorants, deglossing agents, and other materials stored in storage vessels 522 can be transferred from storage vessels 522 into mixer 521 forming a first polymeric composition. Mixer 521 may comprise automated mixing paddles, bars, agitators, or any other suitable mechanical mixing device(s). Mixer 521 mixes the first polymeric composition and then deposits the mixed first polymeric composition into hopper 520, forming a first layer 523 of the first polymeric composition. At some later point, utilizing a substantially similar process, storage vessels 522 can deposit a second polymeric composition into mixer 521. Mixer 521 can mix the second polymeric composition and deposit the mixed second polymeric composition into hopper 520, forming a second layer 524 of the second polymeric composition. Similarly a third layer 525 of a third polymeric composition can be formed. During, or after, this layering process hopper 520 can feed extruder 526 with the first layer 523 of the first polymeric composition. As the first polymeric mixture is forced by an extrusion screw 527 toward the extrusion die 505 the mixture is heated, according to a thermal profile such as discussed in relation to FIG. 6. The heated material, except a substantial portion of the variegating agent 528, may melt and homogenize.

With brief reference to FIG. 5C and continued reference to FIG. 5A, a static mixing hopper 530, suitable for use as cap hopper 501, core hopper 511, or both is depicted in accordance with aspects described herein. The static mixing hopper 530 generally provides temporary storage of a batch of pre-extrusion polymeric material immediately prior to entry into an extruder 526. Static mixing hopper 530 comprises a plurality of protrusions 531. The protrusions 531 can be of any cross section and positioned at various points around static mixing hopper 530. In some aspects, extruder 526 can be cap extruder 502, core extruder 512, or both. As depicted in FIG. 5B the variegating agent, capstock or corestock, additives, fillers, base colorants, and other materials stored in storage vessels 522 can be transferred from storage vessels 522 into static mixing hopper 530. As the ingredients fall into static mixing hopper 530, they may strike one or more protrusions 531 and chaotically change position, thereby forming a consistently random polymeric composition. Upon reaching the bottom of the hopper, the mixture may form a first layer 533. Similarly, a second polymeric composition can be deposited in static mixing hopper 530 forming a second layer 534. During, or after, this layering process, static mixing hopper 530 can feed extruder 526 with the first layer 533 of the first polymeric composition. As the first polymeric mixture is forced by an extrusion screw 527 toward the extrusion die 505 the mixture is heated, according to a thermal profile such as discussed in relation to FIG. 6. The heated material, except a substantial portion of the variegating agent 528, may melt and homogenize.

Figure 6:
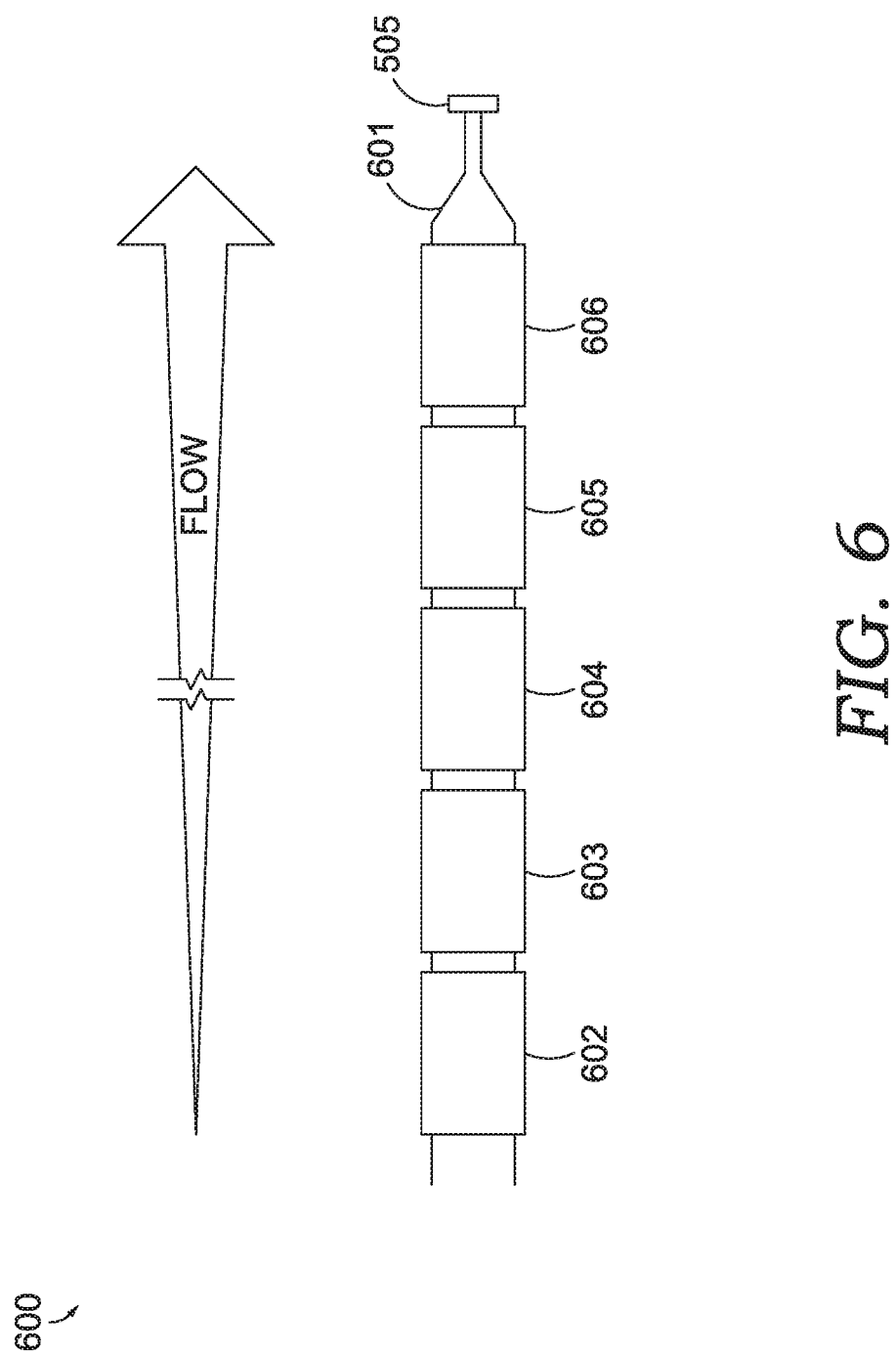
FIG. 6 depicts an example extruder with heating zones, according to aspects described herein.

With brief reference to FIG. 6 and continued reference to FIG. 5A, an example extruder 600 is depicted in accordance with aspects described herein. Extruder 600 is suitable for use in some aspects of cap extruder 502, core extruder 512, or both. Extruder 600 comprises an extrusion barrel 601 and a plurality of heating zones 602-606. Each heating zone can be controlled individually or in combination with other heating zones and facilitate thermal profiles for the extrusion barrel 601. The temperature of a heating zone, such as heating zone 602 or 606, can be in a range of 151° C. to 190° C. In an example, the heating zones 602-606 can create a thermal profile of extrusion barrel 601 such that the first heating zone 602 is set to about 190° C., the second heating zone 603 is set to about 187° C., the third heating zone 604 is set to about 185° C., the fourth heating zone 606 is set to about 182° C., and the fifth heating zone 606 is set to about 179° C. In an additional example, the heating zones 602-606 can create a thermal profile of extrusion barrel 601 such that the first heating zone 602 is set at or above 188° C. and the fifth heating zone 606 is set at or below about 181° C. As such it is contemplated that any temperature may be set in any order within the contemplated range.

Figure 7:
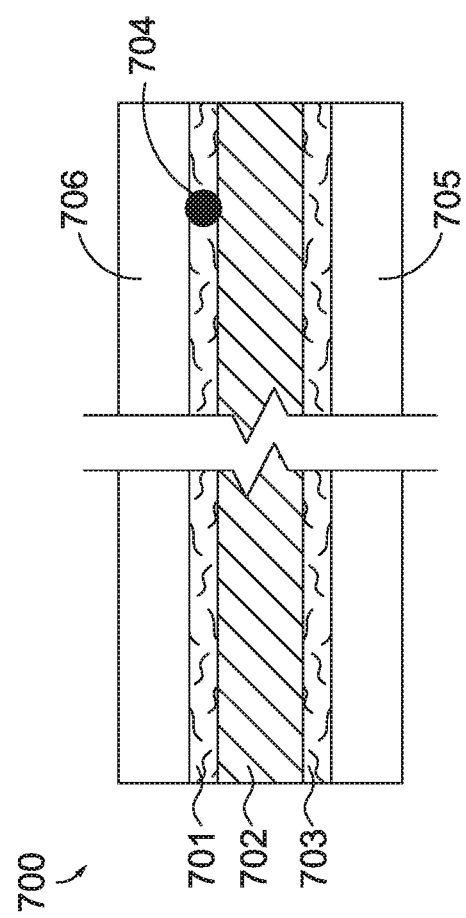
FIG. 7 depicts an example cross section of an extrusion die, according to aspects described herein.

With brief reference to FIG. 7 and continuing reference to FIG. 5A, a cross section of an example co-extrusion die 700 is depicted in accordance with aspects described herein. Co-extrusion die is suitable for use in some aspects of extrusion die 505. The co-extrusion die 700 comprises a first die lip 706 and a second die lip 705. As mentioned above, a relatively high level of gloss can obscure the visual distinction between the variegating agent and the base color in traditional techniques. One way to address this limitation is to reduce the gloss during the extrusion process. For example, by controlling the temperature of an extruded sheet, controlling the temperature of the extruded sheet as the extruded sheet is embossed, or a combination of both may facilitate decreased reflectance and/or diffraction of the polymer's in the cap of the extruded sheet. Accordingly, the first die lip 706 and the second die lip 705 have computer controlled heating elements in some aspects. The temperature of each die lip can be controlled individually or jointly. For example, the temperature of the first die lip 706 can be in a range of 130° C. to 165° C. Similarly, the temperature of the second die lip 705 can be in a range of 130° C. to 165° C.

The co-extrusion die 700 compresses and splits the cap mixture into a first cap mixture 701 proximate the first die lip 706 and a second cap mixture 703 proximate the second die lip 705. Similarly, the co-extrusion die 700 forms a compressed core 702 between the first cap mixture 701 and the second cap mixture 703. Variegating agents, such as the illustratively depicted variegating agent 704, may be caught between the compressed core 702 and the first die lip 706 or the second die lip 705. Variegating agent 704 may slowly erode and deform through friction while obstructed by the die lip from proceeding in a material flow direction of the core and heat. This erosion and deformation creates consistent but non-uniform variegations, such as variegation 106 in the first cap portion 102 and the second cap portion 103 of FIGS. 1A and 4, for example. In some aspects, the co-extrusion die 700 can be fed by a third extruder (not depicted). For example, the first cap mixture 701 can be provided by cap extruder 502, the compressed core 702 can be provided by core extruder 512, and the second cap mixture 703 can be provided by the third extruder (not depicted).

Figure 8:
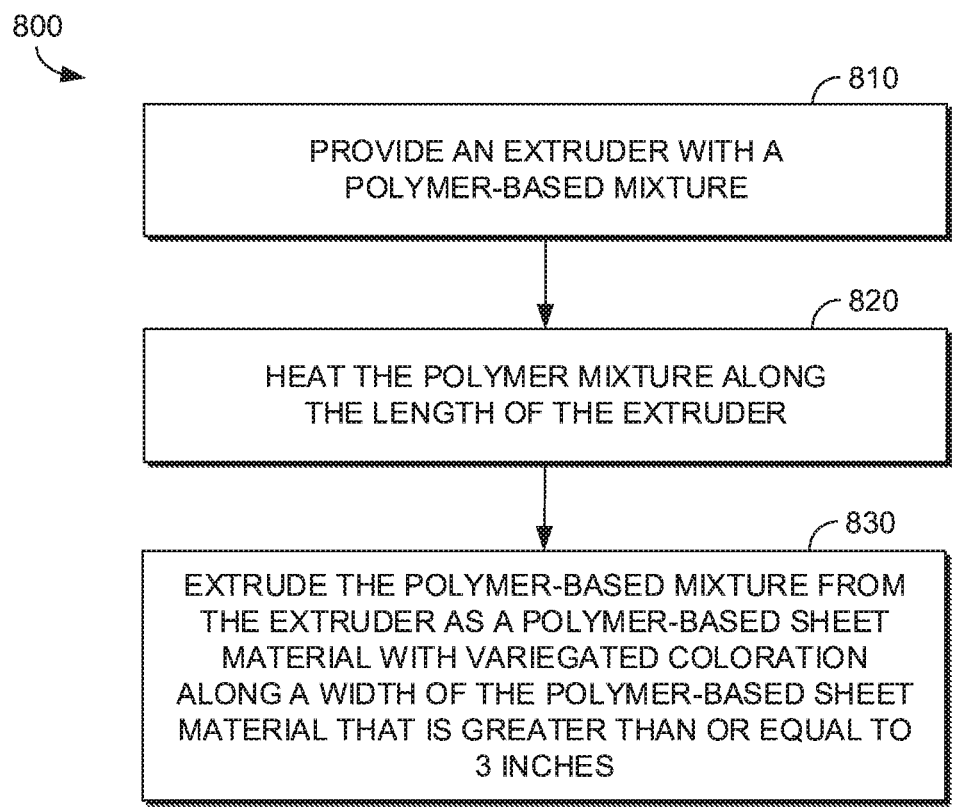
FIG. 8 depicts an example method for the manufacture of a variegated polymer-based sheet.

Turning to FIG. 8, a method 800 for the production of a variegated polymer-based construction material in accordance with aspects described herein is provided. In some aspects, method 800 may be facilitated by system 500. In an example aspect, at block 820 a first polymer-based mixture is fed into a cap extruder 502 and a second polymer-based mixture is fed into a core extruder 512. Feeding the cap extruder 502 begins, in some aspects, by loading the first polymer-based mixture into hopper 501.

In some aspects, method 800 begins at block 810 by providing a first extruder with a first polymer-based mixture. In some aspects, the first polymer-based mixture comprises capstock and a variegating agent. Further, the first polymer-based mixture can include a second variegating agent. The second variegating agent may differ from the first variegating agent by color, density, constituent polymer initial melting point and/or diameter. The polymer-based mixture can be provided by a cap hopper 501 to a cap extruder 502, as discussed with reference to FIG. 5A. Some aspects of block 810 also includes providing a second extruder with a second polymer-based mixture. The second polymer-based mixture comprises corestock and can further include a variegating agent, in some aspects. The polymer-based mixture can be provided by a core hopper 511 to a core extruder 512, as discussed with reference to FIG. 5A.

At block 820, and with reference to FIGS. 5A, 5B, 5C, and 6, the first polymer-based mixture is heated as it is moved along the length of the extruder. For example, the extrusion barrel of the extruder, such as cap extruder 502, can be heated by heating zones, such as heating zones 602-606, in a range of 151° C. to 183° C., in an aspect. In an example aspect, the heating zones 602-606 can create a thermal profile of extrusion barrel 601 such that the first heating zone 602 is set to about 190° C., the second heating zone 603 is set to about 187° C., the third heating zone 604 is set to about 185° C., the fourth heating zone 605 is set to about 182° C., and the fifth heating zone 606 is set to about 179° C. In some aspects of block 820, further comprises heating the second polymer-based mixture as it is moved along the length of a core extruder 512. For example, the extrusion barrel of the core extruder 512 can be heated by heating zones, such as heating zones 602-606, in a range of 151° C. to 183° C., in an aspect. In an example aspect, the heating zones 602-606 can create a thermal profile of extrusion barrel 601 such that the first heating zone 602 is set to about 190° C., the second heating zone 603 is set to about 187° C., the third heating zone 604 is set to about 185° C., the fourth heating zone 605 is set to about 182° C., and the fifth heating zone 606 is set to about 179° C. While specific temperatures are provided for illustrative purposes, it is contemplated that any temperatures may be implemented in any order.

At block 830, and with reference to FIGS. 1A-B, 5A, 5B, 5C, 6, and 7, the first polymer-based mixture is extruded from the cap extruder 502 by an extrusion die 505 as a variegated polymer-based sheet 506 (e.g., 100 of FIG. 1A, 200 of FIG. 1B) with variegations 106 along the width 105 of the polymer-based sheet (e.g., 100 of FIG. 1A, 200 of FIG. 1B). The width 105 of the polymer-based sheet (e.g., 100 of FIG. 1A, 200 of FIG. 1B) is greater than or equal to 3 inches, in some aspects. For example, in some aspects, the width 105 is 3 inches (76.2 mm) or 152 inches (3860.8 mm). In some aspects, the width 105 is between 3 inches (76.2 mm) and 152 inches (3860.8 mm). In some aspects, block 830 further comprises co-extruding the second polymer-based mixture with the first polymer-based mixture. For example, the core extruder 512 can extrude the second polymer-based mixture through an extrusion die, such as co-extrusion die 700. In such an aspect, the co-extrusion die 700 comprises a first die lip 706 and a second die lip 705. The co-extrusion die 700 compresses and splits the cap mixture into a first cap mixture 701 proximate the first die lip 706 and a second cap mixture 703 proximate the second die lip 705. Similarly, the co-extrusion die 700 compresses the mixture of the core 702 between the first cap mixture 701 and the second cap mixture 703. Variegating agents, such as the illustratively depicted variegating agent 704, may be caught between the compressed core 702 and die lip 706 or die lip 705. Variegating agent 704 may slowly erode and deform through friction and heat creating consistent but non-uniform variegations, such as variegation 106 in the first cap portion 102 and the second cap portion 103.

As mentioned above, one limitation of traditional compositions and manufacturing techniques is the relatively high level of gloss that obscures the visual distinction between the variegating agent and the base color. For example, traditional compositions and manufacturing techniques can result in extruded materials with a specular gloss between 30% and 60% as measured by ASTM D523 at an angle of incidence of 85°. One way to address this limitation of traditional techniques is to reduce the gloss of the outer layer of a variegated sheet after extrusion using mechanical abrasion.

Accordingly, some aspects of block 830 includes abrasion of the extruded variegated polymer-based sheet 506 of FIG. 5A. The abrasion of the variegated polymer-based sheet 506 can be facilitated by intentional mechanical contact of the outer surface of the cap for a predetermined period of time with an abrasion agent, such as the abrasion agents of abrader 507. For example, at least one portion of the variegated polymer-based sheet 506 (e.g., the first cap portion 102 of FIG. 1A or the second cap portion 103 of FIG. 1A) can be rubbed for a predetermined period of time by pads including nylon and polyester (such as those available from 3M® among others) of abrader 507 with a pressure in a range of about 1 to about 2 pounds per square inch. Additionally, in particular aspects the abrasion agent can further include feldspar that is either dispersed on the variegated polymer-based sheet 506 or impregnated in the pads of abrader 507. Advantageously, including abrader 507 in some aspects of block 830 can achieve an aesthetically desirable variegated polymer-based sheet by reducing gloss without compromising the structural integrity of the variegated polymer-based sheet. For example, after abrasion for about 10 seconds the specular gloss of the abraded and variegated polymer-based sheet 508 can be between about 20% and about 15% as measured by ASTM D523 at an angle of incidence of 85°. Said differently, aspects of block 830 can reduce the specular gloss of variegated polymer-based sheet 506 by about 60%.

Additionally, or alternatively, aspects of block 830 include embossing the variegated polymer-based sheet with an embossing pattern. As mentioned above, the another way to address the relatively high level of gloss is to reduce the gloss during the embossing process. Accordingly, embossing the variegated polymer-based sheet can be facilitated by a temperature controlled embosser, such as embosser 509. In some aspects, after embossing the specular gloss of the embossed variegated polymer-based sheet 506 can be between about 15% and about 5% as measured by ASTM D523 at an angle of incidence of 85°. Said differently, aspects of block 830 can reduce the specular gloss of variegated polymer-based sheet 506 by about 70%. It is further contemplated that the abraded and variegated polymer-based sheet 508 can be embossed as described above.

Polymer-Based Sheet with Increased Variegation Agent Pellet Density Vs. Cap Thickness As mentioned above, traditional variegated board manufacturing techniques have limitations when used to produce variegated sheets. For example, the flow dynamics, such as laminar flow, that are induced in the melted polymer in an extruder can create disproportionate spreading of the variegating agents to the outer edges (e.g., in the width direction of the sheet) of the mixture during extrusion. While the width to gauge ratio of board extrusion dies may sufficiently address this problem by forcing the mixture into a tighter profile, the increased width to gauge ratio in sheet extrusion can magnify the inconsistent dispersal of the variegating agent. The magnified inconsistent dispersal of variegating agents negatively affects the intended aesthetic of the variegated polymer-based sheet. One way to deal with this issue is to apply a different heat profile across the die to enable faster or slower flow by changing the viscosity of the polymer and variegating agent. Stated differently, to compensate for the different flow characteristics during the formation of a sheet relative to a board, the die's heat profile is adjusted for sheet extrusion relative to board extrusion to influence the speed of flow by both the polymer composition and the variegating agent.

Another way to address this problem is to decrease the density (i.e., decreasing the number of pellets per gram) of the variegating agent. A decrease in pellet density of the variegating agent may provide increased inertial resistance to the flow dynamics in the extruder and facilitate consistent distribution of the variegating agent at the extrusion die. For example, a decrease of the pellet density of the variegating agent from the average pellet density of traditional board variegating agents (e.g., 65 pellets/gram (p/g)) to an average pellet density of 40 p/g±10 produces more consistent variegations in sheet extrusions with gauges, such as cap gauge 114 or core gauge 124, in a range of 0.175 inches (4.445 mm) to 1.25 inches (31.75 mm), as discussed in reference to FIGS. 1A and 1B.

Accordingly, the polymer-based sheet 100 or 200 has a gauge (thickness) 104, a width 105, and a length 201. For example, in some aspects, the gauge 104 is 0.25 inches (6.35 mm), 0.50 inches (12.7 mm), 0.75 inches (19.05 mm), 1.00 inches (25.4 mm), 1.25 inches (31.75 mm), or 1.50 inches (38.1 mm). In some aspects, the gauge 104 is between 0.25 inches (6.35 mm) and 1.50 inches (38.1 mm). The width 105 of the polymer-based sheet 100 may be any width and may vary based on the intended use. For example, in some aspects, the width 105 is 3 inches (76.2 mm) or 152 inches (3860.8 mm). In some aspects, the width 105 is between 3 inches (76.2 mm) and 152 inches (3860.8 mm). The length 201 may be any length and may vary based on the intended use. In some aspects, the length 201 is between 0.5 feet (ft.) (0.1524 m) and 60 ft. (18.288 m).

In some aspects, polymer-based sheet material comprises a core 111 having a gauge (thickness) 124 extending between a first planar surface 112 and the second planar surface 113. In an aspect, the core 111 comprises corestock and can further comprise a base colorant and at least one additive. In some aspects, the gauge 124 of the polymer-based core 111 is in a range of 0.175 inches (4.445 mm) and 1.25 inches (31.75 mm). In an example aspect, the gauge 124 is 0.175 inches (4.445 mm), 0.25 inches (6.35 mm), 0.50 inches (12.7 mm), 1.00 inches (25.4 mm), or 1.25 inches (31.75 mm).

The polymer-based sheet 100 further comprises a polymer-based cap 101 having a first cap portion 102 adjacent the core's 111 first planar surface 112 and a second cap portion 103 adjacent the core's 111 second planar surface 113. In some aspects the first cap portion 102 has a gauge 114 (also referred to as a thickness of the first cap portion) and the second cap portion 103 has a gauge 134 (also referred to as a thickness of the second cap portion). For example, in some aspects, the gauge 114 is 0.0625 inches (1.5875 mm), 0.0714 inches (1.814 mm), 0.0833 inches (2.117 mm), 0.0875 inches (2.225 mm), 0.125 inches (3.175 mm), 0.25 inches (6.35 mm), 0.47 inches (12 mm), 0.50 inches (12.7 mm), or 0.625 inches (15.875 mm). In some aspects, the gauge 134 is 0.0625 inches (1.5875 mm), 0.0714 inches (1.814 mm), 0.0833 inches (2.117 mm), 0.0875 inches (2.225 mm), 0.125 inches (3.175 mm), 0.25 inches (6.35 mm), 0.50 inches (12.7 mm), or 0.625 inches (15.875 mm).

The polymer-based cap 101 further comprises variegations created by a variegating agent with a pellet density range effective for producing a polymer-based sheet. In some aspects, the pellet density is in a range of 40 p/g±10. In some aspects, the ratio of pellet density of the variegating agent to the gauge 114 of the first cap portion 102 is in a range of 571:1 (p/g:inch) to 48:1 (p/g:inch) or 286:1 (p/g:mm) to 8:1 (p/g:mm). In some aspects, the ratio of pellet density of the variegating agent to the gauge 134 of the second cap portion 103 is in a range of 571:1 (p/g:inch) to 48:1 (p/g:inch) or 286:1 (p/g:mm) to 8:1 (p/g:mm). In some aspects, the ratio of pellet density of the variegating agent to the gauge 124 of the core is in a range of 286:1 (p/g:inch) to 24:1 (p/g:inch) or 11:1 (p/g:mm) to 1:1 (p/g:mm). Additionally, in some aspects the polymer-based sheet 100 or 200 is embossed 301 with an embossing pattern applied with about 20 pounds of force per square inch. Further yet, in some aspects the polymer-based sheet 100 or 200 is embossed 301 with an embossing pattern applied with a pressure in a range of about 5 pounds of force per square inch to 35 pounds of force per square inch.

The ratio of pellet density of the variegating agent to the gauge of the first cap portion provides a measure for achieving acceptable variegation consistency for a sheet extrusion. Outside of the provided ratio, the variegation of the extruded sheet material may not be aesthetically acceptable. Because the pellet density of the variegating agent and the thickness of the cap affect the interaction of the variegating agent at the extruder die and/or the interaction of the variegating agent in relation to a surface of a core and the cap, the pellet density of the variegating agent to the gauge of the first cap portion provides a measure for achieving acceptable variegation consistency for a sheet extrusion.

Variegated Polymer-Based Sheet Based on Ratio of Variegating Agent to Capstock

As mentioned above, traditional variegated board manufacturing techniques have limitations when used to produce variegated sheets. For example, traditional board extrusions utilize a variegating agent to polymeric mixture (i.e., all non-variegating agent ingredients) ratio between 1:5 and 3:400. However, sheet extrusions utilizing the traditional ratios result in homogenized sheet coloration approaching the color of the variegating agent. Some aspects discussed herein address traditional problems by providing a polymer-based sheet 100 comprising variegations 106 created by a quantity of variegating agent added in an acceptable ratio with the polymeric mixture (i.e., all non-variegating agent ingredients) forming the cap (e.g., capstock). A ratio of variegating agent to capstock is in a range of 1:200 and 1:1000.

Accordingly, some aspects described herein can be manufactured by an extrusion system, such as system 500. For example, a first polymeric composition is fed into a cap extruder 502. In some aspects, the first polymeric composition includes a quantity of variegating agent and a quantity of capstock with a ratio in a range of 1:200 and 1:1000. In some aspects, a first polymeric composition also includes a quantity of at least one additive, a quantity of at least one base colorant, or any combination thereof. The first polymeric composition can be extruded through extrusion die 505 and form the first cap portion 102, the second cap portion 103, or a combination thereof of the polymer-based sheet 100 or 200.

The ratio of a quantity of variegating agent and a quantity of capstock provides a measure for achieving acceptable variegation consistency for sheet extrusion. Outside of the provided ratio, the variegation of the extruded sheet material may not be aesthetically acceptable. Because the quantity of the variegating agent and the quantity of capstock affect the interaction of the variegating agent at the extruder die and/or the interaction of the variegating agent in relation to a surface of a core and the cap, the ratio of a quantity of variegating agent and a quantity of capstock provides a measure for achieving acceptable variegation consistency for a sheet extrusion.

For another example, a second polymeric composition can be fed into core extruder 512. In some aspects, the second polymeric composition includes a variegating agent and a polymeric mixture (i.e., all non-variegating agent ingredients) forming the core (e.g., corestock) with a ratio in a range of 1:200 and 1:1000. In some aspects, the second polymeric composition also includes a quantity of at least one additive, a quantity of at least one base colorant, a quantity of filler, or any combination thereof. The second polymeric composition can be extruded through extrusion die 505 and form the core 111 of the polymer-based sheet 100 or 200.

The ratio of a quantity of variegating agent and a quantity of corestock provides a measure for achieving acceptable variegation consistency for sheet extrusion. Outside of the provided ratio, the variegation of the extruded sheet material may not be aesthetically acceptable. Because the quantity of the variegating agent and the quantity of corestock affect the interaction of the variegating agent at the extruder die and/or the interaction of the variegating agent in relation to a surface of a core and the cap, the ratio of a quantity of variegating agent and a quantity of corestock provides a measure for achieving acceptable variegation consistency for a sheet extrusion.

The extruded polymer-based sheet 100, 200 has a gauge (thickness) 104, a width 105, and a length 201. The gauge 104 of the polymer-based sheet 100, 200 may be any thickness and may vary based on the intended use. For example, in some aspects, the gauge 104 is 0.125 inches (3.175 mm), 0.25 inches (6.35 mm), 0.50 inches (12.7 mm), 1.00 inches (25.4 mm), 1.25 inches (31.75 mm), or 1.50 inches (38.1 mm). In some aspects, the gauge 104 is between 0.125 inches (3.175 mm) and 1.50 inches (38.1 mm). The width 105 of the polymer-based sheet 100 may be any width and may vary based on the intended use. For example, in some aspects, the width 105 is 3 inches (76.2 mm) or 152 inches (3860.8 mm). In some aspects, the width 105 is between 3 inches (76.2 mm) and 152 inches (3860.8 mm). The length 201 may be any length and may vary based on the intended use. In some aspects, the length 201 is between 0.5 feet (ft.) (0.1524 m) and 60 ft. (18.288 m).

In some aspects, polymer-based sheet material comprises the core 111 having a gauge (thickness) 124 extending between the first planar surface 112 and the second planar surface 113. In an aspect, the core 111 comprises corestock and can further comprise a base colorant and at least one additive. The gauge 124 of the polymer-based core 111 may be any thickness and may vary based on the intended use. For example, in some aspects, the gauge 124 is in a range of 0.175 inches (4.445 mm) to 1.25 inches (31.75 mm). For another example, in some aspects, the gauge 124 is in a range of 0.125 inches (3.175 mm) to 1.5 inches (38.1 mm). In an example aspect, the gauge 124 is 0.125 inches (3.175 mm), 0.175 inches (4.445 mm), 0.25 inches (6.35 mm), 0.50 inches (12.7 mm), 1.00 inches (25.4 mm), or 1.25 inches (31.75 mm).

The polymer-based sheet 100 further comprises a polymer-based cap 101 having a first cap portion 102 adjacent the core's 111 first planar surface and a second cap portion 103 adjacent the core's 111 second planar surface 113. In some aspects the first cap portion 102 has a gauge 114 and the second cap portion 103 has a gauge 134. For example, in some aspects, the gauge 114 is 0.0625 inches (1.5875 mm), 0.0714 inches (1.814 mm), 0.0833 inches (2.117 mm), 0.0875 inches (2.225 mm), 0.125 inches (3.175 mm), 0.25 inches (6.35 mm), 0.47 inches (12 mm), 0.50 inches (12.7 mm), or 0.625 inches (15.875 mm). In some aspects, the gauge 134 is 0.0625 inches (1.5875 mm), 0.0714 inches (1.814 mm), 0.0833 inches (2.117 mm), 0.0875 inches (2.225 mm), 0.125 inches (3.175 mm), 0.25 inches (6.35 mm), 0.50 inches (12.7 mm), or 0.625 inches (15.875 mm).

Variegated Polymer-Based Sheet Based on the Initial Melting Point of the Capstock and Variegating Agent As mentioned above, traditional variegated board manufacturing techniques have limitations when used to produce variegated sheets. Polymer-based sheet extrusion techniques utilize extrusion barrel temperatures that can prematurely melt traditional board variegating agents. This may cause undesired homogenization of the variegation agent and the polymer colorant, which may cause dulling, hazing, or other undesirable chromatic aberrations in polymer-based sheets. For example, traditional board extrusions barrel temperatures are between 151° C. and 183° C. and utilize a variegating agents with a constituent polymer initial melting point between 153.85° C. and 160.04° C. determined by ASTM D-3418 conducted with a Q200 Differential Scanning calorimeter manufactured by TA Instruments. However, as described in regards to FIGS. 5A and 6, polymer-based sheet extrusions barrel temperatures range from 183° C. and 191° C. One way to address this problem is to increase the variegating agent's constituent polymer initial melting point. A sufficiently large increase in the constituent polymer initial melting point allows for consistent variegation of polymer-based sheet.

Accordingly, some aspects described herein can be manufactured by an extrusion system, such as system 500 discussed in relation to FIG. 5. For example, a first polymeric composition is fed into a cap extruder 502. In some aspects, the first polymeric composition includes capstock and a variegating agent comprising a constituent polymer with an initial melting point of at least 161° C. In an aspect, the variegating agent includes a constituent polymer with an initial melting point of in a range of 161° C. to 167° C. determined by ASTM D-3418 conducted with a Q200 Differential Scanning calorimeter manufactured by TA Instruments. In some aspects, the first polymeric composition also includes at least one additive, at least one base colorant, or any combination thereof. The first polymeric composition can be extruded through extrusion die 505 and form the first cap portion 102, the second cap portion 103, or a combination thereof of the polymer-based sheet 100 or 200.

For another example, a second polymeric composition can be fed into core extruder 512. In some aspects, the second polymeric composition includes corestock and a variegating agent comprising a constituent polymer with an initial melting point of at least 161° C. In an aspect, the variegating agent includes a constituent polymer with an initial melting point in a range of 161° C. to 167° C. determined by ASTM D-3418 conducted with a Q200 Differential Scanning calorimeter manufactured by TA Instruments. In some aspects, the second polymeric composition also includes at least one additive, base colorant, filler, or any combination thereof. The second polymeric composition can be extruded through extrusion die 505 to form the core 111 of the polymer-based sheet 100 or 200.

During production of a polymer-based sheet, the extrusion and processing temperatures may be different from the processing temperatures of a polymer-based board. Because sheet extrusion is performed at a higher temperature than board extrusion to achieve an acceptable sheet product, a variegating agent for a sheet product is adjusted to have a higher initial melting temperature than a variegating agent used in the production of a board. Having a variegating agent with a relative higher initial melting temperature for a sheet produces a variegation on the sheet surface instead of a homogenous coloration in an extruded polymer-based sheet. Stated differently, use of a variegating agent traditional used in connection with a board that has a lower initial melting temperature can result in a more homogenous (e.g., less variegated) appearance when forming a polymer-based sheet.

The extruded polymer-based sheet (e.g., 100 of FIG. 1A, 200 of FIG. 1B) has a gauge (thickness) 104, a width 105, and a length 201. The gauge 104 of the polymer-based sheet (e.g., 100 of FIG. 1A, 200 of FIG. 1B) may be any thickness and may vary based on the intended use. For example, in some aspects, the gauge 104 is 0.25 inches (6.35 mm), 0.50 inches (12.7 mm), 1.00 inches (25.4 mm), 1.25 inches (31.75 mm), or 1.50 inches (38.1 mm). In some aspects, the gauge 104 is between 0.25 inches (6.35 mm) and 1.50 inches (38.1 mm). The width 105 of the polymer-based sheet 100 may be any width and may vary based on the intended use. For example, in some aspects, the width 105 is 3 inches (76.2 mm) or 152 inches (3860.8 mm). In some aspects, the width 105 is between 3 inches (76.2 mm) and 152 inches (3860.8 mm). The length 201 may be any length and may vary based on the intended use. In some aspects, the length 201 is between 0.5 feet (ft.) (0.1524 m) and 60 ft. (18.288 m).

In some aspects, polymer-based sheet material comprises a core 111 having a core gauge (thickness) 124 extending between a first planar surface 112 and the second planar surface 113. In an aspect, the core 111 comprises corestock and can further comprise a base colorant and at least one additive. The gauge 124 of the polymer-based core 111 may be any thickness and may vary based on the intended use. For example, in some aspects, the gauge 124 is in a range of 0.175 inches (4.445 mm) and 1.25 inches (31.75 mm). In an example aspect, the gauge 124 is 0.175 inches (4.445 mm), 0.25 inches (6.35 mm), 0.50 inches (12.7 mm), 1.00 inches (25.4 mm), or 1.25 inches (31.75 mm).

The polymer-based sheet 100 further comprises a polymer-based cap 101 having a first cap portion 102 adjacent the core's 111 first planar surface and a second cap portion 103 adjacent the core's 111 second planar surface 113. In some aspects the first cap portion 102 has a gauge 114 and the second cap portion 103 has a gauge 134. For example, in some aspects, the gauge 114 is 0.0625 inches (1.5875 mm), 0.0714 inches (1.814 mm), 0.0833 inches (2.117 mm), 0.0875 inches (2.225 mm), 0.125 inches (3.175 mm), 0.25 inches (6.35 mm), 0.47 inches (12 mm), 0.50 inches (12.7 mm), or 0.625 inches (15.875 mm). In some aspects, the gauge 134 is 0.0625 inches (1.5875 mm), 0.0714 inches (1.814 mm), 0.0833 inches (2.117 mm), 0.0875 inches (2.225 mm), 0.125 inches (3.175 mm), 0.25 inches (6.35 mm), 0.50 inches (12.7 mm), or 0.625 inches (15.875 mm).

System for Manufacturing Variegated Polymer-Based Sheet with Modified Extrusion Barrel Thermal Profile As mentioned above traditional variegated board manufacturing techniques have limitations when used to produce variegated sheets. For example, traditional board extrusion barrel temperatures are between 151° C. and 183° C. with a thermal profile that increases from the feeding location to the extrusion die. An illustrative board thermal profile may comprise 5 zones with zone 1 nearest the feeing location sequentially extending to zone 5 nearest the extrusion die. In this illustration, zone 1 has a barrel temperature about 151° C., zone 2 with a barrel temperature about 157° C., zone 3 with a barrel temperature about 160° C., zone 4 with a barrel temperature about 168° C., and zone 5 (nearest the extrusion die) with a barrel temperature about 173° C. However, the larger volumes of materials used in sheet extrusions relative to board extrusion requires higher thermal profiles. These increase thermal profiles for extruded sheets may require extrusion barrel temperatures that can prematurely melt traditional board variegating agents. This may cause undesired homogenization of the variegation agent and the polymer colorant in a sheet, which may cause dulling, hazing, or other undesirable chromatic aberrations in polymer-based sheets. One way to address this problem is to modify the thermal profile to maximize the initial melting of the polymers and gradually reducing the temperature to reduce the variegating agent's exposure to high temperatures. Stated differently, unlike board extrusion with each zone in a material flow direction increasing in temperature, sheet extrusion may have an initial zone that is a higher temperature than a subsequent zone in a material flow direction. This reduced thermal profile in the material flow direction may delay the variegating agent's propensity to homogenize with the polymer colorant when extruding a sheet.

As discussed with FIG. 6, Extruder 600 comprises an extrusion barrel 601 and a plurality of heating zones 602-606. Each heating zone can be controlled individually or in combination with other heating zones and facilitate thermal profiles for the extrusion barrel 601. The temperature of a heating zone, such as heating zone 602 or 606, can be in a range of 149° C. to 195° C. In an example aspect, the heating zones 602-606 can create a thermal profile of extrusion barrel 601 such that the first heating zone 602 is set to about 190° C., the second heating zone 603 is set to about 187° C., the third heating zone 604 is set to about 185° C., the fourth heating zone 605 is set to about 182° C., and the fifth heating zone 606 is set to about 179° C. This reducing thermal profile in a material flow direction of an extruder may improve variegation by variegating agents in a sheet extrusion.

Method for Variegating Polymer-Based Sheet with Modified Static or Batch Mixing As mentioned above, traditional variegated board manufacturing techniques have limitations when used to produce variegated sheets. Another limitation of traditional compositions and manufacturing techniques is consistent distribution of variegation from the start to finish of the polymer-based sheet in a material flow direction. Said differently, the distribution of variegation from the first portion of the polymer-based material to exit the extrusion die through the last portion to exit the extrusion die may not be consistent. Stated differently yet, the beginning of an extruded sheet has an inconsistent variegation from the end of the sheet when using traditional variegated board manufacturing techniques. This inconsistency can produce excess waste and aesthetically unsatisfactory products. One way to address this problem is through pre-extrusion mixing of the variegating agent into the other ingredients. However, long term storage of pre-mixed ingredients may waste space, prevent dynamic utilization of ingredients in multiple base colorant variegation combinations, and generally increase production costs. Accordingly, some aspects described herein provide batch based pre-extrusion mixing that facilitates consistent variegation of polymer-based extrusions.

In an example aspect, batch mixing can be facilitated by a pre-extrusion hopper, such as hopper 520 fed by a pre-hopper mixer 521. In such an aspect, method 800 further comprises loading a predetermined amount of a first polymeric composition including corestock and a variegating agent in a pre-hopper mixer, such as mixer 521, associated with a hopper (e.g., 520 of FIG. 5B, 501 of FIG. 5A) associated with a cap extruder (e.g., 526 of FIG. 5B, 502 of FIG. 5A). Mixer 521 can mix the second polymeric composition and deposit the mixed second polymeric composition into hopper 520, forming a second layer 524 of the second polymeric composition. Similarly a third layer 525 of a third polymeric composition can be formed. During, or after, this layering process hopper 520 can feed extruder 526 with the first layer 523 of the first polymeric composition. As the first polymeric mixture is forced by an extrusion screw 527 toward the extrusion die 505 the mixture is heated, according to a thermal profile such as discussed in relation to FIG. 6. The heated material, except a substantial portion of the variegating agent 528, may melt and homogenize.

In an example aspect, batch mixing can be facilitated by a static mixing hopper, such as static mixing hopper 530. The static mixing hopper 530 generally provides temporary storage of a batch of pre-extrusion polymeric material immediately prior to entry into an extruder 526. Static mixing hopper 530 comprises a plurality of protrusions 531. The protrusions 531 can be of any cross section and positioned at various points around static mixing hopper 530. In some aspects, extruder 526 can be cap extruder 502, core extruder 512, or both. As depicted in FIG. 5B storage vessels 522 storing a variegating agent, capstock or corestock, additives, fillers, base colorants, and other materials can be transferred from storage vessels 522 into static mixing hopper 530. As the ingredients fall into static mixing hopper 530 they may strike one or more protrusions 531 and chaotically change position, thereby forming a consistently random polymeric composition. Upon reaching the bottom of the hopper the mixture may form a first layer 533. Similarly, a second polymeric composition can be deposited in static mixing hopper 530 forming a second layer 534. During, or after, this layering process static mixing hopper 530 can feed extruder 526 with the first layer 533 of the first polymeric composition. As the first polymeric mixture is forced by an extrusion screw 527 toward the extrusion die 505 the mixture is heated, according to a thermal profile such as discussed in relation to FIG. 6. The heated material, except a substantial portion of the variegating agent 528, may melt and homogenize.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations. Further, the terminology "any of clauses" or similar variations of said terminology is intended to include "any one of clauses" or other variations of such terminology, as indicated by some of the examples provided above.

Clause 1. A polymer-based sheet material, comprising: a core having a first thickness extending between a first planar surface and a second planar surface; a cap, the cap comprising: a first cap portion adjacent the core first planar surface; a second cap portion adjacent the core second planar surface, wherein the first cap portion has a second thickness and the second cap portion has a third thickness; and a variegating agent comprising a colorant, wherein the variegating agent has a pellet density, wherein the pellet density and the second thickness are in a ratio within a range of 571:1 (pellets per gram (p/g):inch) to 48:1 (p/g:inch) or 286:1 (p/g:mm) to 8:1 (p/g:mm).

Clause 2. The polymer-based sheet material of clause 1, wherein the core comprises high density polyethylene (HDPE) and a filler.

Clause 3. The polymer-based sheet material of clauses 1 or 2, wherein the first thickness is in a range of 0.175 inches (4.445 mm) and 1.25 inches (31.75 mm).

Clause 4. The polymer-based sheet material of clauses 1 or 2, wherein the first thickness is 0.175 inches (4.445 mm), 0.25 inches (6.35 mm), 0.50 inches (12.7 mm), 0.75 inches (19.05 mm), 1.00 inches (25.4 mm), or 1.25 inches (31.75 mm).

Clause 5. The polymer-based sheet material of any of clauses 1 through 4, wherein the cap comprises a polymer.

Clause 6. The polymer-based sheet material of clause 5, wherein the polymer of the cap comprises polypropylene (PP) or a polyethylene based ionomer.

Clause 7. The polymer-based sheet material of clauses 6, wherein the polymer of the cap further comprises HDPE.

Clause 8. The polymer-based sheet material of clause 7, wherein PP to HDPE is in a ratio with a ratio range of 1:10 to 2:5.

Clause 9. The polymer-based sheet material of any of clauses 1 through 8, wherein the first cap portion comprises an exterior surface forming an exterior surface of the polymer-based sheet material.

Clause 10. The polymer-based sheet material of any of clauses 1 through 9, wherein the first cap portion is embossed with an average thickness in a range of 0.00039 inches (0.01 mm) to 0.118 inches (3 mm).

Clause 11. The polymer-based sheet material of any of clauses 1 through 10, wherein the first cap portion and the second cap portion are embossed with a common embossing pattern.

Clause 12. The polymer-based sheet material of clause 11, wherein the common embossing pattern has an average thickness in a range of 0.00039 inches (0.01 mm) to 0.118 inches (3 mm).

Clause 13. The polymer-based sheet material of any of clauses 1 through 12, wherein the pellet density is less than or equal to 40 p/g.

Clause 14. The polymer-based sheet material of any of clauses 1 through 12, wherein the pellet density is less than or equal to 30 p/g.

Clause 15. The polymer-based sheet material of any of clauses 1 through 14, wherein the pellet density and the first thickness are in a ratio within a range of 286:1 (p/g:inch) to 24:1 (p/g:inch) or 11:1 (p/g:mm) to 1:1 (p/g:mm).

Clause 16. The polymer-based sheet material of any of clause 1 through 14, wherein the pellet density and the third thickness are in a ratio within a range of 571:1 (p/g:inch) to 48:1 (p/g:inch) or 286:1 (p/g:mm) to 8:1 (p/g:mm).

Clause 17. A polymer-based sheet material, comprising: a core having a first planar surface and a second planar surface; and a cap, the cap comprising a polymeric composition comprising a first quantity of a polymer and a second quantity of a variegating agent, wherein a ratio of the second quantity to the first quantity is in a range of 1:200 and 1:1000.

Clause 18. The polymer-based sheet material of clause 17, wherein the core comprises a cellulose-based composition or a foamed polymer.

Clause 19. The polymer-based sheet material of clauses 17 or 18, wherein the core comprises a high density polyethylene (HDPE) based composition.

Clause 20. The polymer-based sheet material of any of clauses 17 through 19, wherein the cap is adjacent the core.

Clause 21. The polymer-based sheet material of any of clauses 17 through 20, wherein the polymer comprises capstock.

Clause 22. The polymer-based sheet material of clause 21, wherein the polymer comprises polypropylene (PP).

Clause 23. The polymer-based sheet material of clause 22, wherein the polymer further comprises HDPE.

Clause 24. The polymer-based sheet material of clause 23, wherein PP to HDPE is in a ratio with a range of 1:10 to 2:5.

Clause 25. The polymer-based sheet material of any of clauses 17 through 24, wherein the core has a first thickness in a range of 0.125 inches (3.175 mm) and 1.5 inches (38.1 mm).

Clause 26. The polymer-based sheet material of any of clauses 17 through 25, wherein the cap comprises: a first cap portion adjacent the core first planar surface; and a second cap portion adjacent the core second planar surface.

Clause 27. The polymer-based sheet material of clause 26, wherein the first cap portion comprises an exterior surface forming an exterior surface of the polymer-based sheet material.

Clause 28. The polymer-based sheet material of any of clauses 17 through 27, wherein the polymeric composition further comprises a scratch-resistant polymer.

Clause 29. The polymer-based sheet material of any of clauses 17 through 28, wherein the polymeric composition further comprises PP or polyethylene in a third quantity.

Clause 30. The polymer-based sheet material of any of clauses 17 through 29, wherein the polymeric composition further comprises a base colorant in a fourth quantity.

Clause 31. The polymer-based sheet material of any of clauses 17 through 29, wherein the polymeric composition further comprises UV protectant in a fifth quantity.

Clause 32. A polymer-based sheet material, comprising: a core having a first planar surface and a second planar surface; and a cap comprising a polymeric composition comprising a polymer with a first initial melting point and a variegating agent with a second initial melting point.

Clause 33. The polymer-based sheet material of clause 32, wherein the variegating agent comprises a constituent polymer.

Clause 34. The polymer-based sheet material of clause 33, wherein the second initial melting point is measured on the constituent polymer.

Clause 35. The polymer-based sheet material of any of clauses 32 through 34, wherein the second initial melting point is in a range of between 161° C. to 167° C.

Clause 36. The polymer-based sheet material of any of clauses 32 through 34, wherein the second initial melting point is at least 161° C.

Clause 37. The polymer-based sheet material of any of clauses 32 through 36, wherein the first initial melting point is about 130° C.

Clause 38. The polymer-based sheet material of any of clauses 32 through 37, wherein the core comprises a high density polyethylene (HDPE) based composition.

Clause 39. The polymer-based sheet material of any of clauses 32 through 38, wherein the core comprises a cellulose-based composition.

Clause 40. The polymer-based sheet material of any of clauses 32 through 39, wherein the core has a first thickness in a range of 0.125 inches (3.175 mm) and 1.5 inches (38.1 mm).

Clause 41. The polymer-based sheet material of any of clauses 32 through 40, wherein the cap comprises: a first cap portion adjacent the core first planar surface; and a second cap portion adjacent the core second planar surface.

Clause 42. The polymer-based sheet material of any of clauses 32 through 41, wherein the first cap portion has a second thickness in a range of 0.0625 inches (1.5875 mm) to 0.625 inches (15.875 mm).

Clause 43. The polymer-based sheet material of any of clauses 32 through 41, wherein the second cap portion has a third thickness of 0.0625 inches (1.5875 mm), 0.0714 inches (1.814 mm), 0.0833 inches (2.117 mm), 0.0875 inches (2.225 mm), 0.125 inches (3.175 mm), 0.25 inches (6.35 mm), 0.50 inches (12.7 mm), or 0.625 inches (15.875 mm).

Clause 44. The polymer-based sheet material of any of clauses 41 through 43, wherein the variegating agent has a pellet density, and wherein the pellet density and the second thickness are in a ratio within a range of 571:1 (pellets per gram (p/g):inch) to 48:1 (p/g:inch) or 286:1 (p/g:mm) to 8:1 (p/g:mm).

Clause 45. A system for manufacturing a polymer-based sheet material, comprising: a core extrusion assembly comprising a first extruder for extruding a core composition having a first planar surface and a second planar surface; and a cap extrusion assembly comprising: a second extruder for extruding a cap composition, the second extruder having a first end and a second end with a set of temperature zones between the first end and the second end of the second extruder, wherein the second end is more proximate an extrusion die than the first end; and a capstock hopper for supplying the second extruder the cap composition at the first end of the second extruder, wherein a temperature of a first temperature zone of the set of temperature zones proximate the first end is greater than a second temperature zone of the set of temperature zones, wherein the second temperature zone is more proximate the second end.

Clause 46. The system of clause 45, wherein the core extrusion assembly further comprises a first core hopper for supplying the first extruder the core composition at the first end of the first extruder.

Clause 47. The system of clauses 45 or 46, wherein the core extrusion assembly further comprises a second core hopper for supplying the first extruder a core variegation composition to the first extruder.

Clause 48. The system of any of clauses 45 through 47, wherein the core composition comprises a first polymeric mixture and a filler.

Clause 49. The system of any of clauses 45 through 48, wherein the first polymeric mixture comprises corestock.

Clause 50. The system of any of clauses 45 through 49, wherein the first polymeric mixture further comprises an additive.

Clause 51. The system of any of clauses 45 through 50, wherein the cap composition comprises a second polymeric mixture and a variegating agent.

Clause 52. The system of clause 51, wherein the second polymeric mixture comprises capstock.

Clause 53. The system of clause 50 through 52, wherein the variegating agent comprises a constituent polymer with an initial melting point in a range of between 161° C. to 167° C.

Clause 54. The system of any of clauses 45 through 53, wherein the temperature of each temperature zone is in a range of 149° C. and 195° C.

Clause 55. The system of any of clauses 45 through 54, wherein the set of temperature zones comprises five or more temperature zones.

Clause 56. The system of any of clauses 45 through 55, wherein the temperature of a first temperature zone is about 190° C.

Clause 57. The system of any of clauses 45 through 56, wherein the temperature of a second temperature zone is about 187° C.

Clause 58. The system of any of clauses 45 through 57, wherein the temperature of a third temperature zone is about 185° C.

Clause 59. The system of any of clauses 45 through 58, wherein the temperature of a fourth temperature zone is about 182° C.

Clause 60. The system of any of clauses 45 through 59, wherein the temperature of a fifth temperature zone is about 179° C.

Clause 61. The system of any of clauses 45 through 60, wherein the cap extrusion assembly further comprises a mixer for supplying the capstock hopper the cap composition.

Clause 62. The system of any of clauses 45 through 61, wherein the capstock hopper comprises an inner surface for holding the cap composition, the inner surface having a plurality of protrusions.

Clause 63. A method for manufacturing a polymer-based sheet material comprising: providing a first extruder with a first polymer-based mixture heating the first polymer-based mixture along a length of the first extruder; and extruding the first polymer-based mixture from the first extruder as the polymer-based sheet material having a variegated coloration along a width of the polymer-based sheet material that is greater than or equal to 3 inches.

Clause 64. The method of clause 63, wherein the first polymer-based mixture comprises high density polyethylene (HDPE).

Clause 65. The method of clause 63 or 64, wherein the first polymer-based mixture comprises a cellulose-based composition.

Clause 66. The method of any of clauses 63 through 65, wherein the first extruder comprises a thermal profile having a temperature in a range of 149° C. and 195° C.

Clause 67. The method of any of clauses 63 through 66, wherein the first extruder has an initial temperature at a first end and a second temperature at an opposite second end, wherein the first polymer-based mixture is provided more proximate the first end than the opposite second end.

Clause 68. The method of clause 67, wherein the initial temperature is about 190° C.

Clause 69. The method of clauses 67 or 68, wherein the second temperature is about 179° C.

Clause 70. A polymer-based sheet material, comprising: a core having a first planar surface and a second planar surface; and a cap adjacent at least the core first planar surface, the cap comprising a polymeric composition comprising a first variegating agent and a second variegating agent, wherein the first variegating agent is different from the second variegating agent.

Clause 71. The polymer-based sheet material of clause 70, wherein the core comprises HDPE.

Clause 72. The polymer-based sheet material of clauses 70 or 71, wherein the core comprises a cellulose-based composition.

Clause 73. The polymer-based sheet material of any of clauses 70 through 72, wherein the cap is further adjacent the core second planar surface.

Clause 74. The polymer-based sheet material of any of clauses 70 through 73, wherein the first variegating agent has a first size and the second variegating agent has a second size.

Clause 75. The polymer-based sheet material of any of clauses 70 through 74, wherein the first variegating agent has a first constituent polymer initial melting temperature the second variegating agent has a second constituent polymer initial melting temperature.

Clause 76. The polymer-based sheet material of any of clauses 70 through 75, wherein the first variegating agent has a first pellet density in the polymeric composition and the second variegating agent has a second pellet density in the polymeric composition.

Clause 77. The polymer-based sheet material of any of clauses 70 through 76, wherein the first variegating agent has a first color and the second variegating agent has a second color.

Clause 78. A method for manufacturing the polymer-based sheet material of any of clauses 1 through 16 comprising: providing a first extruder with a first polymer-based mixture; heating the first polymer-based mixture; and extruding the first polymer-based mixture from the first extruder as the polymer-based sheet material having a variegated coloration.

Clause 79. A method for manufacturing the polymer-based sheet material of any of clauses 17 through 31 comprising: providing a first extruder with a first polymer-based mixture; heating the first polymer-based mixture; and extruding the first polymer-based mixture from the first extruder as the polymer-based sheet material having a variegated coloration.

Clause 80. A method for manufacturing the polymer-based sheet material of any of clauses 32 through 44 comprising: providing a first extruder with a first polymer-based mixture; heating the first polymer-based mixture; and extruding the first polymer-based mixture from the first extruder as the polymer-based sheet material having a variegated coloration.

Clause 81. A method for manufacturing the polymer-based sheet material of any of clauses 70 through 77 comprising: providing a first extruder with a first polymer-based mixture; heating the first polymer-based mixture; and extruding the first polymer-based mixture from the first extruder as the polymer-based sheet material having a variegated coloration.

Clause 82. A system for manufacturing the polymer-based sheet material of any of clauses 1 through 16, comprising: a core extrusion assembly comprising a first extruder for extruding a core composition having a first planar surface and a second planar surface; and a cap extrusion assembly comprising: a second extruder for extruding a cap composition.

Clause 83. A system for manufacturing the polymer-based sheet material of any of clauses 17 through 31, comprising: a core extrusion assembly comprising a first extruder for extruding a core composition having a first planar surface and a second planar surface; and a cap extrusion assembly comprising: a second extruder for extruding a cap composition.

Clause 84. A system for manufacturing the polymer-based sheet material of any of clauses 32 through 44, comprising: a core extrusion assembly comprising a first extruder for extruding a core composition having a first planar surface and a second planar surface; and a cap extrusion assembly comprising: a second extruder for extruding a cap composition.

Clause 85. A system for manufacturing the polymer-based sheet material of any of clauses 70 through 77, comprising: a core extrusion assembly comprising a first extruder for extruding a core composition having a first planar surface and a second planar surface; and a cap extrusion assembly comprising: a second extruder for extruding a cap composition.

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

The term "about" is used herein to account for variability in manufacturing tolerances and instrumentation accuracy and precision. For example, temperature measurement instrumentation and temperature control instrumentation from a particular manufacturer may not be as accurate or precise as the instrumentation of another manufacturer. Similarly, manufacturers of polymeric compositions (such as capstock, corestock, or variegating agents) may use different production methods or have different purity tolerances that can create relatively small differences in density, initial melt temperature, viscosity, and the other properties discussed herein. Accordingly, the term about refers to ±10% of the relevant value.

As used herein, melting point refers to the temperature where a polymer begins the transition between a crystalline or semi-crystalline state and a flow state. For a mixture, the initial melting point is the lowest temperature at which a constituent polymer begins to transition between a crystalline or semi-crystalline state and a flow state.

Unless indicated otherwise, ASTM testing, temperatures (such as initial melting points, barrel temperatures, and so forth), and all other data values are at standard atmospheric conditions (i.e., 1 atmosphere of pressure).

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

We claim:

1. A material comprising:
    a polymer-based sheet extrudate having,
        a core having a first planar surface and a second planar surface; and
        a cap comprising a polymeric composition comprising a polymer with a first initial melting point and a variegating agent with a second initial melting point;
    wherein, at extrusion, the polymer-based sheet extrudate has a width to gauge ratio greater than or equal to 12:1 at extrusion.

2. The material of claim 1, wherein the variegating agent comprises a constituent polymer.

3. The material of claim 2, wherein the second initial melting point is measured on the constituent polymer.

4. The material of claim 1, wherein the second initial melting point is in a range of between 161° C. to 167° C.

5. The material of claim 1, wherein the second initial melting point is at least 161° C.

6. The material of claim 1, wherein the first initial melting point is about 130° C.

7. The material of claim 1, wherein the core comprises high density polyethylene (HDPE).

8. The material of claim 1, wherein the core comprises cellulose.

9. The material of claim 1, wherein the core has a first thickness in a range of 0.125 inches (3.175 mm) to 1.5 inches (38.1 mm).

10. The material of claim 1, wherein
    a first portion of the cap is adjacent the core first planar surface; and
    a second portion of the cap is adjacent the core second planar surface.

11. The material of claim 10, wherein the first portion of the cap has a second thickness in a range of 0.0625 inches (1.5875 mm) to 0.625 inches (15.875 mm).

12. The material of claim 11, wherein the variegating agent has a pellet density, and wherein the pellet density and the second thickness are in a ratio within a range of 571:1 (pellets per gram (p/g):inch) to 48:1 (p/g:inch) or 286:1 (p/g:mm) to 8:1 (p/g:mm).

13. The material of claim 10, wherein the second portion of the cap has a third thickness of 0.0625 inches (1.5875 mm), 0.0714 inches (1.814 mm), 0.0833 inches (2.117 mm), 0.0875 inches (2.225 mm), 0.125 inches (3.175 mm), 0.25 inches (6.35 mm), 0.50 inches (12.7 mm), or 0.625 inches (15.875 mm).

14. The material of claim 1, wherein the variegating agent has a proportionate distribution throughout the cap.

15. The material of claim 1, wherein the core includes a base colorant.

16. The material of claim 15, wherein the variegating agent and base colorant differ by at least one of hue, tint, shade, tone, saturation, lightness, chroma, or intensity.

17. The material of claim 1 wherein the variegating agent is randomly distributed throughout the cap.

* * * * *